United States Patent
Moshfeghi

(10) Patent No.: US 8,629,764 B2
(45) Date of Patent: *Jan. 14, 2014

(54) METHOD AND APPARATUS FOR POWER MANAGEMENT FOR A RADIO FREQUENCY IDENTIFICATION SYSTEM

(71) Applicant: Golba LLC, Rancho Palos Verdes, CA (US)

(72) Inventor: Mehran Moshfeghi, Rancho Palos Verdes, CA (US)

(73) Assignee: Golba LLC, Rancho Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/669,394

(22) Filed: Nov. 5, 2012

(65) Prior Publication Data

US 2013/0120118 A1      May 16, 2013

Related U.S. Application Data

(63) Continuation of application No. 11/726,061, filed on Mar. 20, 2007, now Pat. No. 8,305,190.

(51) Int. Cl.
*H04Q 5/22*     (2006.01)

(52) U.S. Cl.
USPC .......................... 340/10.4; 340/10.3

(58) Field of Classification Search
USPC ............... 340/572.1, 10.34, 10.3, 10.31
See application file for complete search history.

(56) References Cited

U.S. PATENT DOCUMENTS

| | | | |
|---|---|---|---|
| 5,999,124 A | 12/1999 | Sheynblat | |
| 6,131,067 A | 10/2000 | Girerd et al. | |
| 6,185,427 B1 | 2/2001 | Krasner et al. | |
| 6,198,913 B1 | 3/2001 | Sung et al. | |
| 6,215,441 B1 | 4/2001 | Moeglein et al. | |
| 6,671,520 B1 | 12/2003 | Kim | |
| 6,920,330 B2 | 7/2005 | Caronni et al. | |
| 7,295,114 B1 | 11/2007 | Drzaic et al. | |
| 7,741,970 B2 | 6/2010 | Cunningham et al. | |
| 8,305,190 B2 | 11/2012 | Moshfeghi | |
| 2003/0222150 A1 | 12/2003 | Sato et al. | |
| 2004/0095241 A1 | 5/2004 | Maloney | |
| 2004/0212500 A1 | 10/2004 | Stilp | |
| 2004/0217865 A1 | 11/2004 | Turner | |
| 2005/0030160 A1 | 2/2005 | Goren et al. | |
| 2005/0088284 A1 | 4/2005 | Zai et al. | |
| 2005/0104790 A1 | 5/2005 | Duron | |

(Continued)

FOREIGN PATENT DOCUMENTS

| KR | 2007/0067774 | 6/2007 |
|---|---|---|
| KR | 10-0761900 | 9/2007 |
| WO | 2005/091997 | 10/2005 |

OTHER PUBLICATIONS

Portions of prosecution history of U.S. Appl. No. 11/726,061, Sep. 21, 2012, Moshfeghi, Mehran.

(Continued)

*Primary Examiner* — Brian Zimmerman
*Assistant Examiner* — Omer S Khan
(74) *Attorney, Agent, or Firm* — Adeli & Tollen LLP

(57) ABSTRACT

A method and device of power management for a networked radio frequency identification ("RFID") system are disclosed. The described power management methods reduce the power consumption of battery-operated RFID readers and RFID tags. These power conservation methods increase the RFID system's hours of operation and decrease the cost by allowing the RFID readers and tags to function for a longer period of time before requiring charging or replacement of their batteries.

10 Claims, 15 Drawing Sheets

(56) References Cited

U.S. PATENT DOCUMENTS

| | | |
|---|---|---|
| 2005/0198228 A1 | 9/2005 | Bajwa et al. |
| 2005/0242188 A1 | 11/2005 | Vesuna |
| 2006/0007049 A1* | 1/2006 | Nitzan et al. .................. 343/904 |
| 2006/0022802 A1 | 2/2006 | Bridgelall |
| 2006/0047381 A1 | 3/2006 | Nguyen |
| 2006/0047789 A1* | 3/2006 | Kumar et al. .................. 709/220 |
| 2006/0068750 A1 | 3/2006 | Burr |
| 2006/0083257 A1 | 4/2006 | Price et al. |
| 2006/0124738 A1* | 6/2006 | Wang et al. .................. 235/385 |
| 2006/0130046 A1 | 6/2006 | O'Neill |
| 2006/0287740 A1 | 12/2006 | Ertel |
| 2007/0018820 A1 | 1/2007 | Chand et al. |
| 2007/0115137 A1 | 5/2007 | Lyon et al. |
| 2007/0229281 A1 | 10/2007 | Shionoiri et al. |
| 2007/0241902 A1 | 10/2007 | Chang |
| 2007/0243851 A1 | 10/2007 | Shoarinejad et al. |
| 2008/0100423 A1 | 5/2008 | Geissler et al. |
| 2008/0100435 A1 | 5/2008 | Jorgenson et al. |
| 2008/0111661 A1 | 5/2008 | Lin et al. |
| 2008/0125959 A1 | 5/2008 | Doherty et al. |
| 2008/0191845 A1 | 8/2008 | Strzelczyk |
| 2009/0309704 A1 | 12/2009 | Chang et al. |
| 2010/0156610 A1 | 6/2010 | Wild et al. |
| 2010/0295663 A1 | 11/2010 | Shoarinejad et al. |
| 2011/0156640 A1 | 6/2011 | Moshfeghi |
| 2013/0120116 A1 | 5/2013 | Moshfeghi |

OTHER PUBLICATIONS

Author Unkown "Four Challenges", Month Unknown, 2004, pp. 1-7.

Author Unknown, "Cisco Application-Oriented Networking Facilities Intelligent Radio Frequency Identification Processing at the Edge", Month Unknown, 2005, pp. 1-9.

Author Unknown, "ConnecTerra Product Family", www.connecterra.com, Month Unknown, 2005, pp. 1-2.

Author Unknown, "Delivery an Intelligent Foundation for RFID: Maximizing Network Efficiency With Cisco RFID Solutions", Month Unknown, 2005, pp. 1-6.

Author Unknown, "Establishing the Foundation for Enterprise-Scale RFID Deployments", www.connecterra.com/products/rftagaware.php, Sep. 2005, pp. 1-2.

Author Unknown, "Installation Manual R500HA Long Range RFID Reader", www.iautomate.com, Month Unknown, 2005, pp. 1-40.

Author Unknown, "The Sun Global RFID Network Vision: Connecting Businesses at the Edge of the Network", A Technical White Paper, Jul. 2004, pp. 1-20.

Author Unknown, RFTag Aware™ Enterprise Server, Centralized EPC Data Management and Reporting for Enterprise-Scale RFID Deployments, www.connecterra.com, Month Unknown, 2005, pp. 1-2.

Clark, Sean, et al., "Auto-ID Savant Specification 1.0", Month Unknown, 2003, pp. 1-58.

Miller, Leonard E., "Why UWB? A Review of Ultra wideband Technology" National Institute of Standards and Technology, DARPA, Apr. 2003, pp. 1-72, Gaithersburg, Maryland.

Miller, Leonard E., "Wireless Technologies and the SAFECOM SoR for Public Safety Communications", National Institute of Standards and Technology, Month Unknown, 2005, pp. 1-68, Gaithersburg, Maryland.

Reynolds, Matthew, et al., "Design Considerations for embedded software-defined RFID Readers", Emerging Wireless Technology/ A Supplement to RF Design, Aug. 2005, pp. 14-15.

\* cited by examiner

METHOD AND APPARATUS FOR POWER MANAGEMENT FOR A RADIO FREQUENCY IDENTIFICATION SYSTEM

CLAIM OF BENEFIT TO PRIOR APPLICATIONS

This application is a continuation application of U.S. patent application Ser. No. 11/726,061, filed Mar. 20, 2007, now published as U.S. Publication 2008/0231449. U.S. patent application Ser. No. 11/726,061, now published as U.S. Publication 2008/0231449 is incorporated herein by reference.

FIELD OF THE INVENTION

The present invention relates to wireless communication. More specifically, the present invention relates to a radio frequency identification ("RFID") communications network.

BACKGROUND OF THE INVENTION

Radio frequency ("RF") and wireless communication technologies have become an integral part of our modern lives. RFID applications having short and/or long range communication capabilities have been applied in various business operations, such as supply chain automation, inventory tracking, smartcard applications, and security accessing. In one example, telemetry applications are used to gather data for temperature, motion, sound, video, light and moisture. RFID technology typically employs backscattered RF power or energy to identify distance objects.

An RFID system typically includes readers and tags, also known as transponders. RFID is a wireless technology that uses electronic tags for storing data. RFID tags are read when they are close to a transmitted radio signal from an RFID reader. RFID readers manage RFID tags and pass their information also known as tag data onto network servers, corporate databases and business applications. The readers act like gateways between tags and corporate servers/databases by providing RF interfaces to tags on one side, and standard network interfaces on the other side.

Mobile RFID readers typically operate on batteries. Certain types of tags, called active tags, also require batteries to operate. A problem associated with battery operated RFID devices is limited battery life. As such, the performance and uninterrupted operation of an RFID device are closely related to its power efficiency, because it stops working when its battery is drained. Accordingly, there is a need in the art to improve power efficiency for RFID devices to enhance the overall performance of the RFID system.

SUMMARY OF THE INVENTION

The present invention discloses a technique of power management for a radio frequency identification ("RFID") system. The RFID system includes an RFID tag and an RFID reader wherein the RFID tag further includes a memory and an antenna. The RFID reader is logically coupled to the RFID tag and, in one embodiment, it includes power management devices, a digital processing controller, and a display. The power management devices are configured to conserve power in response to ambient information from the surrounding environment of the RFID device. The digital processing controller controls communications between the RFID tag and the RFID reader. The power management, in one embodiment, is capable of switching a component, such as the display of the reader, into a low power operating mode or a sleep state to conserve power.

Additional features and benefits of the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
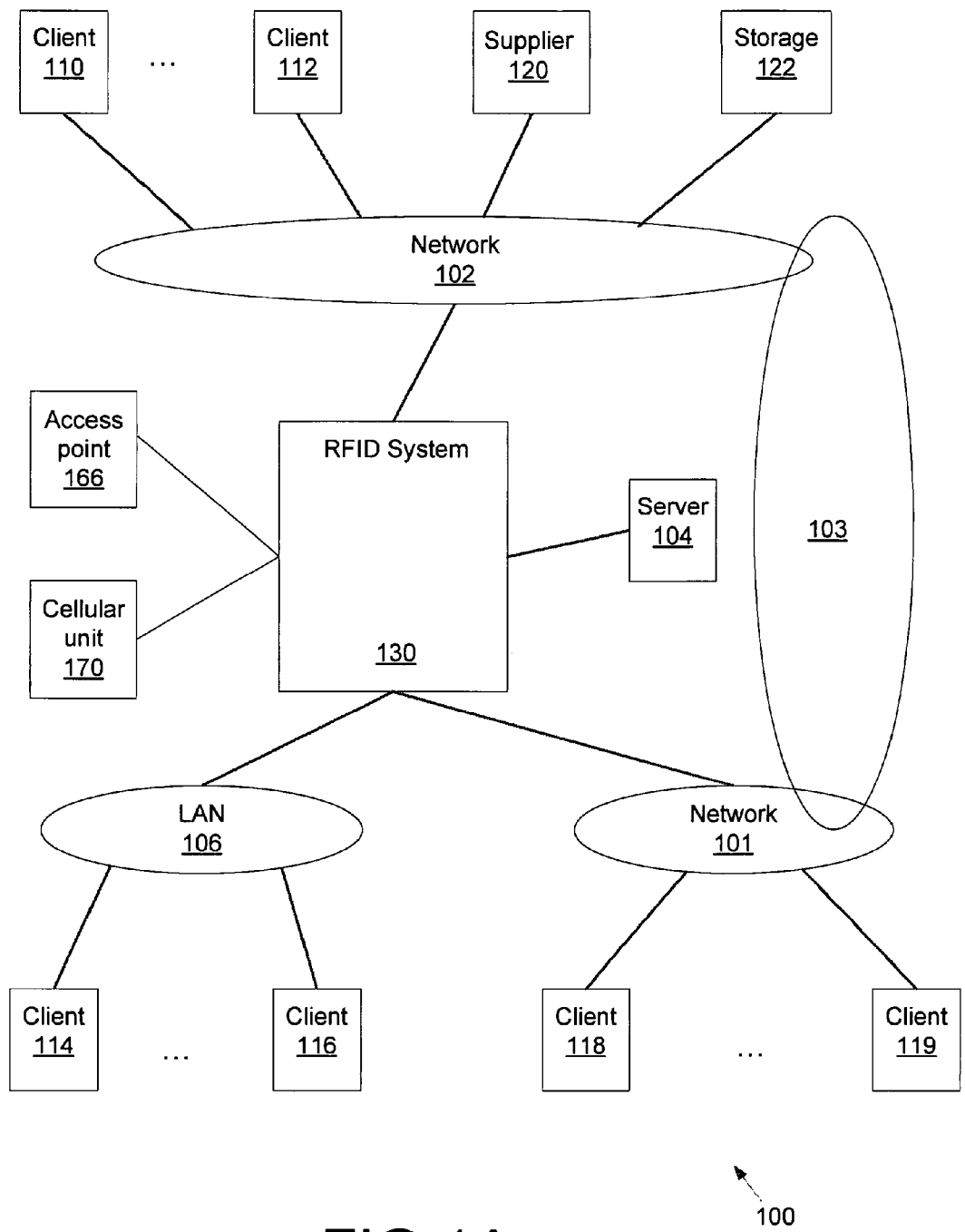
FIG. 1A is a computer network topology illustrating a network environment in which an RF system can be implemented in accordance with one embodiment of the present invention.

Embodiments of the present invention are described herein in the context of a method, system and apparatus for providing power management for systems using radio frequency identification ("RFID"). Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The present invention discloses a technique of power management for conserving power in an RFID system. The RFID system includes an RFID tag and an RFID reader wherein the RFD tag also includes a memory and an antenna. The RFID reader, which is logically coupled to the RFID tag, includes a power management unit, a digital processing controller, and a display. The power management unit is configured to conserve power in response to ambient information obtained from the surrounding environment of the reader. The processing controller controls communications between RFID tags, reader, and access point(s). The display is capable of entering a sleep state for conserving power in response to an energy conserving command from the power management unit.

The power management unit is configured to control power consumption in RFID readers, RFID tags, and RFID system applications. The present invention of power management can be implemented primarily in hardware, software, or a combination of hardware and software. The power management is implemented in RFID readers, tags, and/or system applications. The power management unit may use various power saving techniques, such as eliminating duplicate tag data, grouping data transmissions, entering low power consumption mode (or sleep state), changing data transmission frequency, reducing clock cycles for RFID devices; and using wireless ad-hoc network transmission schemes.

The method of eliminating duplicates further includes filtering duplicated tag data and/or incomplete tag data from tag reads before forwarding the data to access points. Every data transmission consumes power. The power consumption of an RFID reader is reduced if the numbers of transmissions are decreased. Thus, eliminating unnecessary data such as duplicate data will conserve power. Another method of reducing the number of transmissions is to group the tag data, in which the power management groups multiple data transmissions into one data transmission. It should be noted that multiple data transmissions consume more power than a single large data transmission.

An RFID device, such as a reader, is capable of entering into a low power consumption mode or a sleep state, hereinafter referred to as a sleep state. A sleep state occurs when some or all of the circuits in an RFID device are turned off. In addition, a sleep state can be triggered by location, motion, or a power saving command. For instance, the power management switches a portion or all of the circuits in an RFID reader into a sleep state if the reader is not reading or is not in a tag reading zone. Also, an RFID reader may enter into a sleep state if the reader is not moving (or still) for a period of time. The period of time, which determines whether the reader is still or moving, may be predefined by a user. For example, an on-board sensor detects the movement of the reader and if the reader is not moving, it instructs the power management to turn off all or a portion of the circuitry in the reader to conserve power.

Adjusting or reducing circuit clock frequency is another power saving method for an RFID device because the RFID device consumes more power if it operates in a high clock frequency. Signal boosters and/or ad-hoc networking may also be used to conserve power. In another embodiment, an RFID device, such as a tag or reader, is integrated into other electronic devices such as cellular phones and personal digital assistants ("PDA's"), which allow the RFID device to access larger batteries.

An RFID application based power saving method, in one embodiment, interrogates RFID tags using techniques of radio frequency coverage and power efficient positions to conserve power. The RFID application method may further include controlling readers to avoid multiple tag reads of the same tag. A method of graceful degradation of the RFID application may also be employed when the battery levels are reduced.

RFID tag based power management includes using compact representations for storing information on the tags. Integrating active tags into other devices such as cellular phones and PDAs with larger batteries is an alternative option to conserve power. Also, if the active tags are not being read, they may be switched into sleep states, or they may reduce their circuit clock frequency to conserve power. In one embodiment, low power tags are configured to communicate their status of low battery power to nearby readers or other tags in order to be re-programmed/re-configured for conserving power. RFID readers and tags can also use AC powered signal boosters or active tag ad-hoc networking to conserve power.

FIG. 1A is a computer network topology 100 illustrating a network environment in which a RF system can be implemented in accordance with one embodiment of the present invention. Wide-area network 102 includes the Internet, or other proprietary networks including America On-Line™, SBC™, Microsoft Network™, and Prodigy™. Wide-area network 102 and may further include network backbones, long-haul telephone lines, Internet service providers, various levels of network routers, and other means for routing data between computers. In one aspect, Network 101 is a wireless communications network, such as T-mobile or Verizon wireless networks. Network 101 is coupled to Network 102 via Network 103, which can be another public network or private network. It should be noted that Network 101, 102 and 103 can be the same network. It should be obvious to one skilled in the art that it is within the scope of the present invention if additional systems are added to or subtracted from the computer network 100.

In this network environment, an RFID system 130 is coupled to wide-area networks 101-102. RFID system 130 is further coupled to an access point 166 and a cellular base station unit 170. In one embodiment, RFID system 130 includes power management which is used to converse power consumption within RFID system 130. Server 104 is coupled to RFID system 130 and it is, in one aspect, used to assist routing data to clients 114-116 through a local-area network ("LAN") 106 and wide-area networks 101-103. The LAN connection allows client system 114 to communicate with RFID system 130 or other systems through LAN 106, and to communicate with clients 110-112 via LAN 106 and wide-area network 102 and/or network 103. Using conventional network protocols, RFID system 130 may communicate through wide-area network 102 to a plurality of client computer systems 110-112, supplier system 120, and storage device 122. For example, client system 110 is connected directly to wide-area network 102 through direct or dial-up telephone or other network transmission lines. Alternatively, clients 110-112 may be connected through wide-area network 102 using a modem pool.

Using one of a variety of network connection means, RFID system 130, which may include an RFID tag, an RFID reader, a personal computer ("PC"), a mini-computer, a server, a workstation, or a mainframe computer, that support multiple applications of RFID system 130 to clients across the network. In one embodiment, RFID system 130 may store and retrieve various electronic information (or data) in storage system 122 through a wide-area network 102. RFID system 130 is capable of obtaining information such as supplier's inventory from supplier system 120 via the network.

Figure 1B:
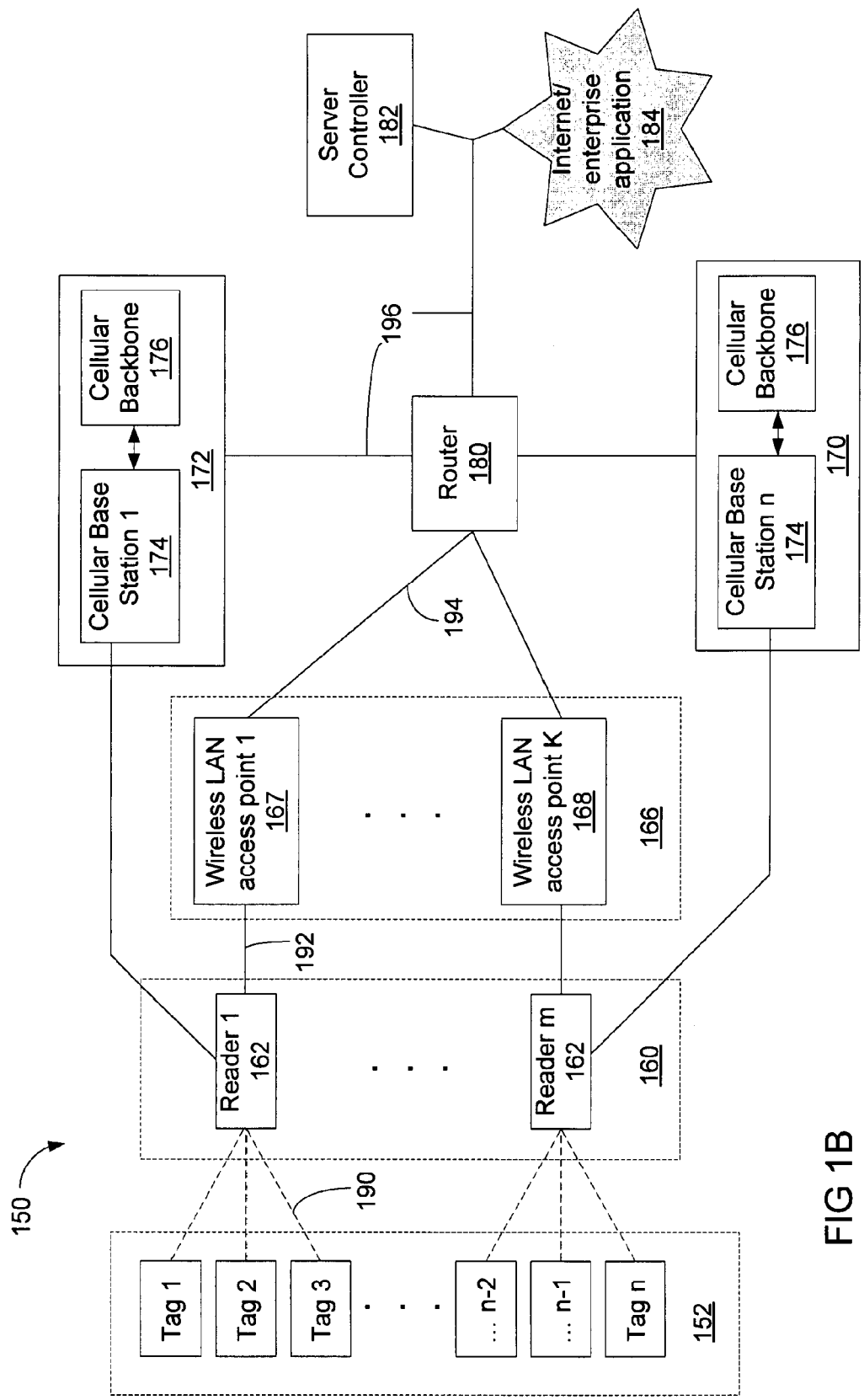
FIG. 1B is a block diagram illustrating an RFID network system in accordance with one embodiment of the present invention.

Having briefly described one embodiment of the network environment in which the present invention operates, FIG. 1B illustrates an RFID network system 150 that is coupled to a communications network 184 via intermediate devices such as a router 180. RFID network system 150 includes multiple RFID tags 152, RFID readers 160, access points 166-172, and a communication network 184. In one embodiment, access points 166-172 further include wireless LAN access points 166 and cellular access points 170-172. RFID network system 150 is coupled to a communications network or Internet 184 via switcher or router(s) 180.

RFD network system 150, in one embodiment, supports many types of communication protocols, such as TCP/IP, UDP, http, SNMP, and 802.11* WLAN, cellular (GPRS, CDMA, GSM, CDPD, 2.5G, 3G, etc), bluetooth, Ultra-Wide-Band (UWB), WiMax, Zigbee, and/or other ad-hoc/mesh network technologies. An advantage of using such existing networking infrastructures is to enhance the flexibility and to reduce the implementation cost of an RFID system. RFID network system 150 also includes multiple readers 1 . . . m 162, which in one embodiment may be integrated into other electronic products, such as cellular phones, PDAs, laptops, wireless game consoles, etc. To conserve power consumption, readers 160 are configured to perform filtering operations, which eliminate duplicate and incomplete tag reads and thereby eliminate unnecessary network traffic.

Referring back to FIG. 1B, RFID tags 152 include n number of tags ranging from tag 1 to tag n, wherein n can be any integer number. Tags 152 include various types of tags, such as tag type A, B, C, and D. For example, tag type A is a passive tag that has no internal power source and it obtains power from its antenna when it is interrogated by a reader (backscattering modulation). Tag type A usually has a memory device as such ROM for storing information such as a tag ID code. Tag type B is also a passive tag that has no internal power source. Tag type B obtains power from its antenna when it is interrogated by a reader and uses the power for its circuit. Tag type B also has memory, and it is possible for a reader to interrogate the tag and write to the tag's memory. Active tags are also available for an RFID network system 150. For example, tag type C contains a battery, ROM and RAM. Similarly, tag type D also includes a battery, ROM and RAM and is capable of communicating with others sensors, tags, and devices. It should be noted that other type of tags may also be available in an RFID system.

Tag types A and B are typically smaller and less expensive than tags types C and D. Tag types C and D however have more capabilities. Tag types A, B, C, and D are sometimes referred to as class-1, class-2, class-3 and class-4, respectively. The ranges of these tags vary from 0.3 meters ("m") for A and B, 100 m for C, and up to 30,000 m for D. Active sensor tags can measure environmental data such as temperature, light, sound, video, acceleration, vibration, pressure and movement. RFID network system 150 illustrates a group of tags 152 (passive tag or active tags with batteries) and battery operated readers 160, wherein readers 160 are capable of having multimode wireless radios that communicate with WLAN access points 166 and cellular access points 170-172.

RFID reader (or reader) 160 includes m number of readers from reader 1 . . . m 162, wherein m can be any integer number. In one embodiment, readers 160 include power management to manage power consumption for readers 160 and tags 152. Reader 1 is capable of interrogating tag 1, 2 and 3 via radio frequency 190. Once the information or tag data is obtained from tags 1 to 3, reader 1 passes the information (or tag data) to an access point(s) using wireless (or RF) signals 192. The access point, which could be a wireless LAN access point 167 or a cellular base station 174, transmits the information to a server via the Internet or other communications network 184.

RFID network system 150 illustrates two Internet Protocol ("IP") based networking Wireless LAN (WLAN) 166 and cellular infrastructures 170-172. RFID readers 160, in one embodiment, support multiple networks such as the Transmission Control Protocol and the Internet Protocol ("TCP/IP"), User Datagram Protocol ("UDP"), Hypertext Transfer Protocol ("HTTP"), Simple Network Management Protocol ("SNMP"). If reader 162 is equipped with WLAN functionality, it can communicate with an AC powered access point 167, which further links to the Internet 184 via a router/switch 180. It should be noted that router/switch 180 may also be limited by proprietary or organizational firewalls. In another embodiment, if reader 162 has a cellular functionality such as General Packet Radio Services ("GPRS"), Code Division Multiple Access ("CDMA"), Global System for Mobile Communications ("GSM"), Cellular Digital Packet Data ("CDPD"), 2.5G and 3G, reader 162 can communicate with an AC powered cellular base-station 174 and a cellular backbone 176, which is further coupled to servers over the network via router(s) 180. Alternatively, if reader 162 is equipped with both WLAN and cellular functionalities, it can either use WLAN network or cellular network or both to communicate with the networks. While FIG. 1B shows WLAN 166 and cellular communications networks 170-172, readers 160 can also be equipped with other types of networking interfaces such as Bluetooth, Ultra-Wideband (UWB), WiMax, Zigbee, and ad-hoc/mesh network.

In operation, tags 152 are configured to store encoded information such as Electronic Product Code ("EPC") data in their memories. Nearby readers 160, such as reader 162, is capable of reading EPC of tag 1 or tag 3. Once readers 160 read the tag data from tags 152, readers 160 forward the tag data to WLAN access points 166, which subsequently forward the tag data to servers via Internet 184. WLAN access points 166, a router 180 or an internet/intranet server controller 182 with RFID middleware and/or RFID software, initiates tag read commands to readers 160. After receipt of tag read commands, readers 160 interrogate a set of tags 152. Readers 160, in one embodiment, interrogate tags 152 and read encoded tag information and/or EPC from tags 152. Each reader 162, in one embodiment, contains RFID middleware/software that is capable of performing a filtering operation to filter duplicate and false tag data. After the filtering operation, readers 160 forward the data to WLAN access points 166, or cellular network 170-172, or both. WLAN access points 166 may also provide network security, encryption, authentication, and bridge/route the wireless traffic to a wired Ethernet network, or the Internet via a router 180. WLAN access points 166 having RFID middleware/software components are capable of filtering duplicate reads of the same tag by different readers. WLAN access points 166 subsequently forward the data to router 180. Router 180 may be also configured to have RFID middleware/software components for performing some data processing capabilities (or functions) before forwarding the data to Internet/Intranet servers.

Next generation Cellular networks 170 use packet switching technology such as GPRS and CDPD to facilitate RF communications between various RFID devices. Conventional telephony and older cellular networks use circuit switched technology which provides a dedicated path wherein all packets travel along the same path to a receiver. With packet switching, however, router 180 and/or similar routers in Internet 184 determine different paths for each packet, and a packet assembler rearranges the packets from a random order into a logical order.

RFID readers 160, in one embodiment, are equipped with cellular radios (instead of or in addition to 802.11* wireless LAN radios) and are configured to use cellular base stations 174 and backbone 176 to connect to Internet 184 via router 180. It should be noted that RFID network system 150 only shows one router 180, which connects to both cellular network 170-172 and WLAN 166. Router 180 can be a cluster of routers or switches. It should be noted that it can be many other variations of RFID network system 150 as illustrated in FIG. 1B. For example, WLAN access points 166 and cellular network 170-172 are combined into one access point. Also, WLAN access points 166 and cellular network 170 may be integrated into router 180.

Figure 2A:
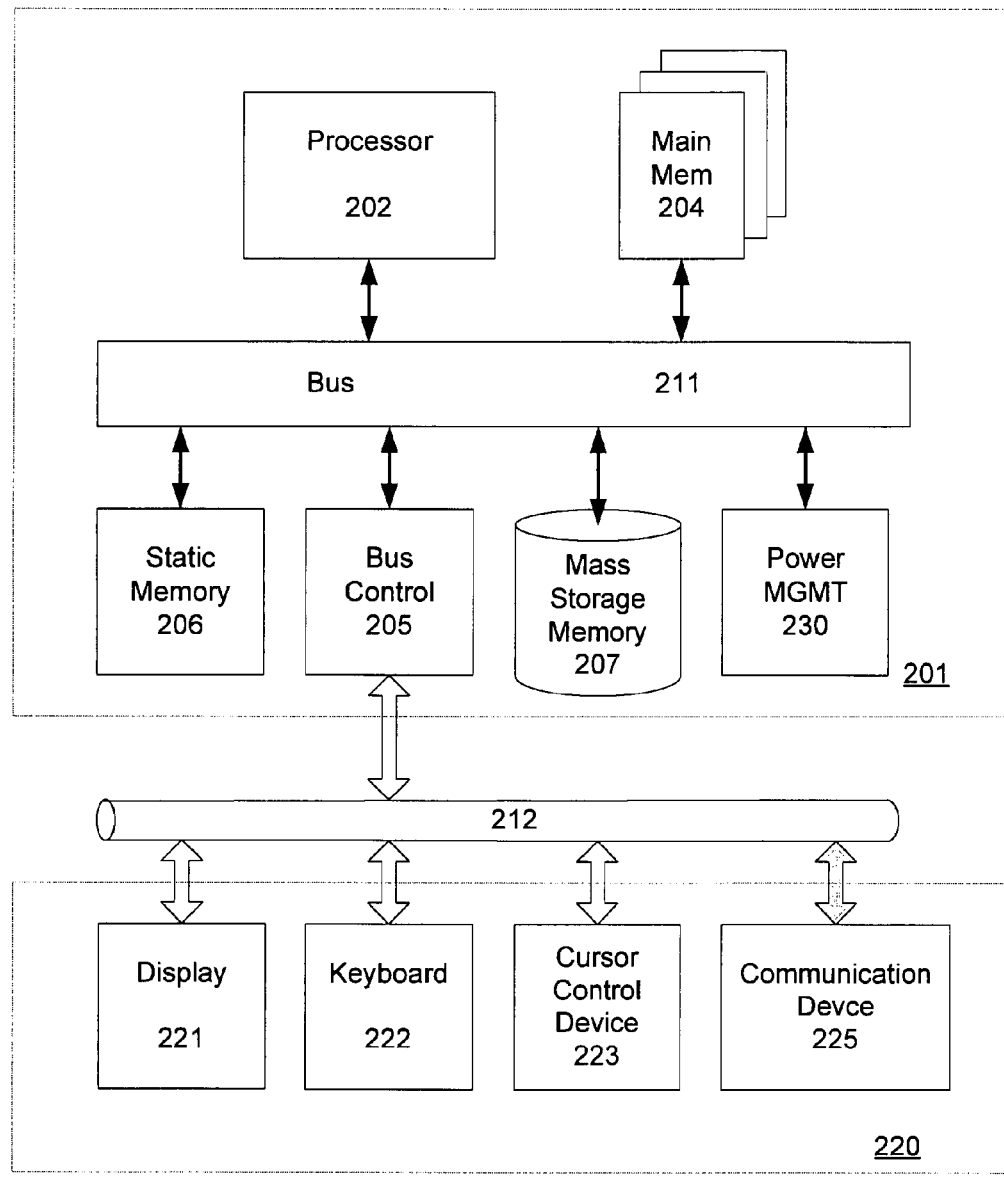
FIG. 2A is a system diagram illustrating a computer system wherein the system includes power management in accordance with one embodiment of the present invention.

Having described embodiments of the network environments in which the present invention operates, FIG. 2A illustrates a computer system 200 which includes a RF power management unit in accordance with one embodiment of the present invention. Computer system 200 is an exemplary client system 110-116, or a system or a reader in which the features of the present invention may be implemented. The present invention can be implemented in any processor-based computer system, such as a PC, a workstation, a mainframe computer or a microprocessor based digital processing device. It will be apparent to those of ordinary skill in the art that other alternative computer system architectures may also be employed.

Referring back to FIG. 2, computer system 200 includes a processing unit 201, an interface bus 211, and an input/output ("IO") unit 220. Processing unit 201 includes a processor 202, a main memory 204, a system bus 211, a static memory device 206, a bus control unit 205, a mass storage memory 207, and a power management 230. Bus 211 is used to transmit information between various components and processor 202 for data processing. Processor 202 may be any of a wide variety of general-purpose processors or microprocessors such as Pentium™ microprocessor, Motorola™ 68040, or Power PC™ microprocessor.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to buses 211-212 and controls which component, such as main memory 204 or processor 202, can use the bus. Bus control unit 205 manages the communications between bus 211 and bus 212. Mass storage memory 207 may be a magnetic disk, an optical disk, a hard disk drive, a floppy disk, a CD-ROM, and/or flash memories for storing large amounts of data. Power management 230 may in one embodiment, be an independent component (IC) that performs functions of RF communications as well as other tasks. In another embodiment, Power management 230 may reside within the processor 202, main memory 204, and/or static memory 206.

I/O unit 220, in one embodiment, includes a display 221, keyboard 222, cursor control device 223, and communication device 225. Display device 221 may be a liquid crystal device, cathode ray tube ("CRT"), touch-screen display, or other suitable display device. Keyboard 222 may be a conventional alphanumeric input device for communicating information between computer system 200 and computer operator(s). Another type of user input device is cursor control device 223, such as a conventional mouse, touch mouse, trackball, or other type of cursor for communicating information between system 200 and user(s).

Communication device 225 is coupled to bus 211 for accessing information from remote computers or servers, such as server 104 or other computers, through wide-area network 102. Communication device 225 may include a modem or a network interface device, Wireless LAN or cellular radio, or other similar devices that facilitate communication between computer 200 and the network. Computer system 200 may be coupled to a number of servers 104 via a network infrastructure such as the infrastructure illustrated in FIG. 1A.

Figure 2B:
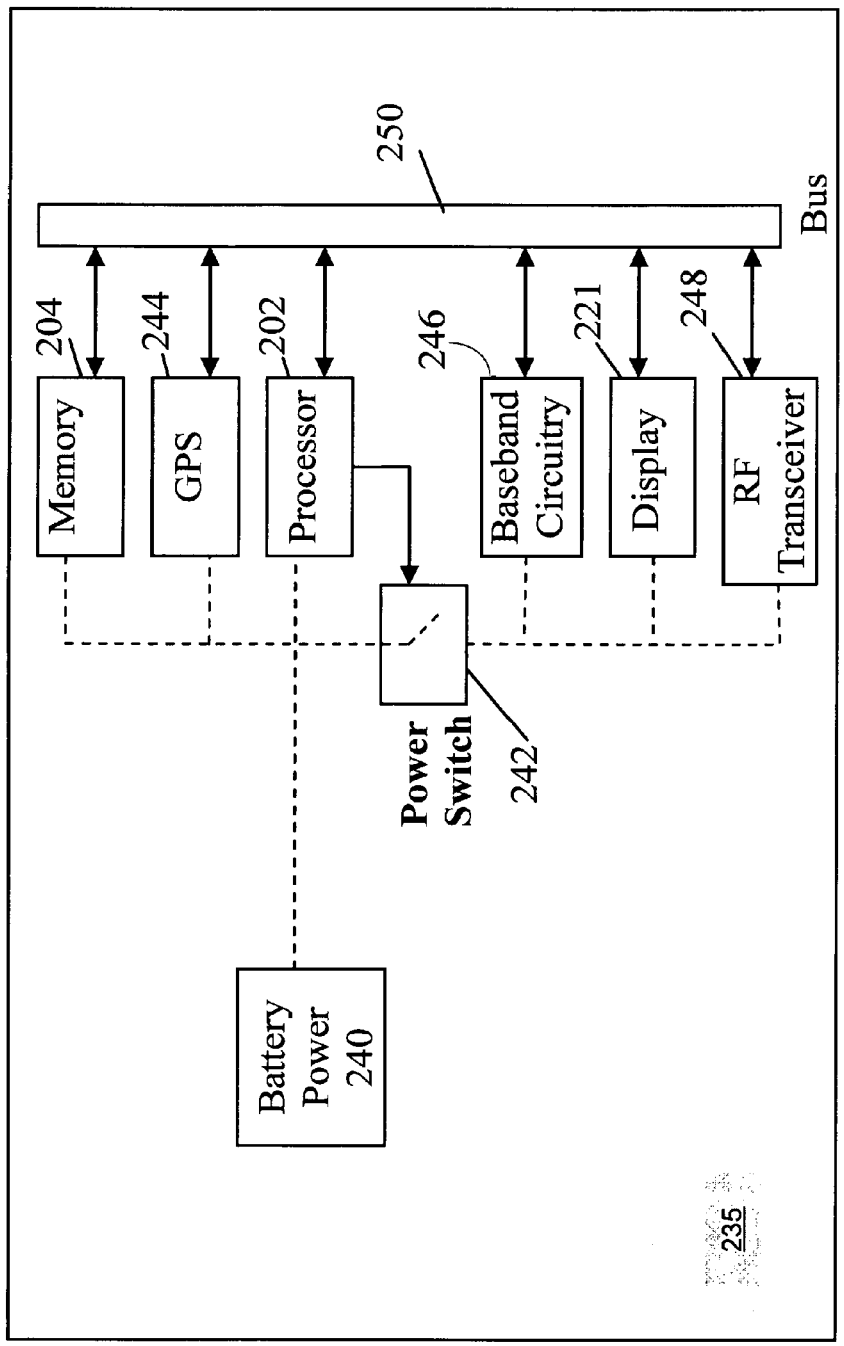
FIG. 2B is an RFID reader system unit using GPS positioning information to conserve power in accordance with one embodiment of the present invention.

FIG. 2B is a block diagram illustrating an RFID reader system 235 having a power management unit using GPS positioning information in accordance with one embodiment of the present invention. The RFID reader system or reader 235, hereinafter referred to as reader 235, includes a memory 204, a GPS device 244, a digital processing controller or processor 202, a power switch 242, a battery 240, a baseband circuitry 246, an interface unit or display device 221, and an RF transceiver 248. Bus 250 is used to interconnect the devices in reader 235.

Digital processing controller or processor 202, hereinafter referred to as "processor", may be any of a wide variety of general-purpose processors as described earlier. In one embodiment, processor 202 is used to control activities of reader 235 including power management. Memory 204, which is also referred to as memory unit and storage location, stores data such as recovery data. Recovery data restores a device, such as processor 202, from a sleep state to an activate state. The interface unit or display device 221 may be a liquid crystal device, touch-screen display, or any suitable display device that can be mounted on reader 235. Bus 250 may be a system bus that is used for transferring information between components within reader 235.

Baseband circuitry 246, which is also known as a base modulator or line coding, is used to transfer a digital bit stream over an analog RF baseband channel. RF transceiver 248, in one embodiment, receives and transmits RF signals between tags 152 and reader 235. RF transceiver 248 is also capable of receiving and transmitting data between reader 235 and an access point. Battery power unit 240 supplies power to reader 235 and power switch 242 is used to switch on or off all or a portion of components such as display 221, baseband circuitry 246 and/or RF transceiver 248 in reader 235. It should be noted that power switch 242 can be a hardware switch, software switch, or a combination of hardware and software switches. The terms power switching unit, power switch, and switch, will be used interchangeably.

In one embodiment, power management uses GPS device 244 to conserve power. GPS device 244 is configured to receive navigation radio signals ("GPS signals") from a satellite navigation system such as Navigation Signal Timing and Ranging Global Positioning System ("Naystar GPS"). GPS device 244 is capable of determining the geographic location of reader 235 according to GPS signals. According to the physical location of reader 235, GPS device 244 or Processor 202 determines whether reader 235 is within any predetermined active reading zones. Information relating to the predetermined active reading zones is preloaded and stored in reader 235, such as in memory 204. If reader 235 is in at least one of the active reading zones according to the GPS signals, processor 202 instructs power switch 242 to activate sleeping components such as baseband circuitry 246 and display device 221 from a sleep state to an active state. Conversely, if reader 235 is outside of any predetermined active reading zones, processor 202 instructs power switch 242 to switch all or a portion of active components in reader 235, such as baseband circuitry 246, display device 221, and RF transceiver, from the active state to the sleep state. It should be noted that some other components such as processor 202 can also be switched in full or half sleep state for conserving power. For example, if reader 235 is not in a predetermined active reading zone and its GPS coordinates are not changing for a certain period of time then the reader is considered to be stationary and even the processor can be put in a sleep state and awaken when the GPS coordinates change.

Power management using GPS 244 in an RFID reader is useful for certain RF applications. For example, an RFID application requires mobile readers to operate at certain rooms, spaces or physical locations. When a RF reader is outside of a reading zone or a hot zone area, power management switches the RF reader to a sleep state for power savings. If, however, reader 235 is equipped with GPS chips and the GPS information indicates that reader 235 has just moved into a location that requires tag reads, reader 235 is activated from the sleep state. In one embodiment, GPS 244, memory 204, and processor 202 are configured to remain powered-on all the time whether reader 235 is within or outside an active reading zone.

Alternatively, only the necessary components in a reader (or an active tag) are active and the remaining components are in the sleep state to conserve power. For instance, GPS 244 may stay active while the remaining components such as processor 202, a portion of memory 204, baseband circuitry 246, display 221, and RF transceiver 248 are all in sleep mode. It should be noted that other devices such as motion sensors may be used together with GPS devices 244 for power management in an RFID devices. It should be further noted that RFID devices includes RFID readers, RFID tags, and so forth.

An advantage of adding the power management to RFID devices enhances the performance of the RFID network. For example, the efficiency of an RFID network can be improved in terms of hours of operation, amount of information gathered and processed, and graceful degradations for RFID applications. Reducing power consumption also lowers cost (e.g. cost of replacing batteries or the use of smaller battery sources). For example, readers 160 use various sleep states (power down or low-power levels with displays turned off and/or CPU frequency lowered) when no reads are needed in order to reduce charge/current/energy usage from their batteries. In another example, a manual power on/off switch may be used to turn the power to reader 235 on or off.

Figure 3:
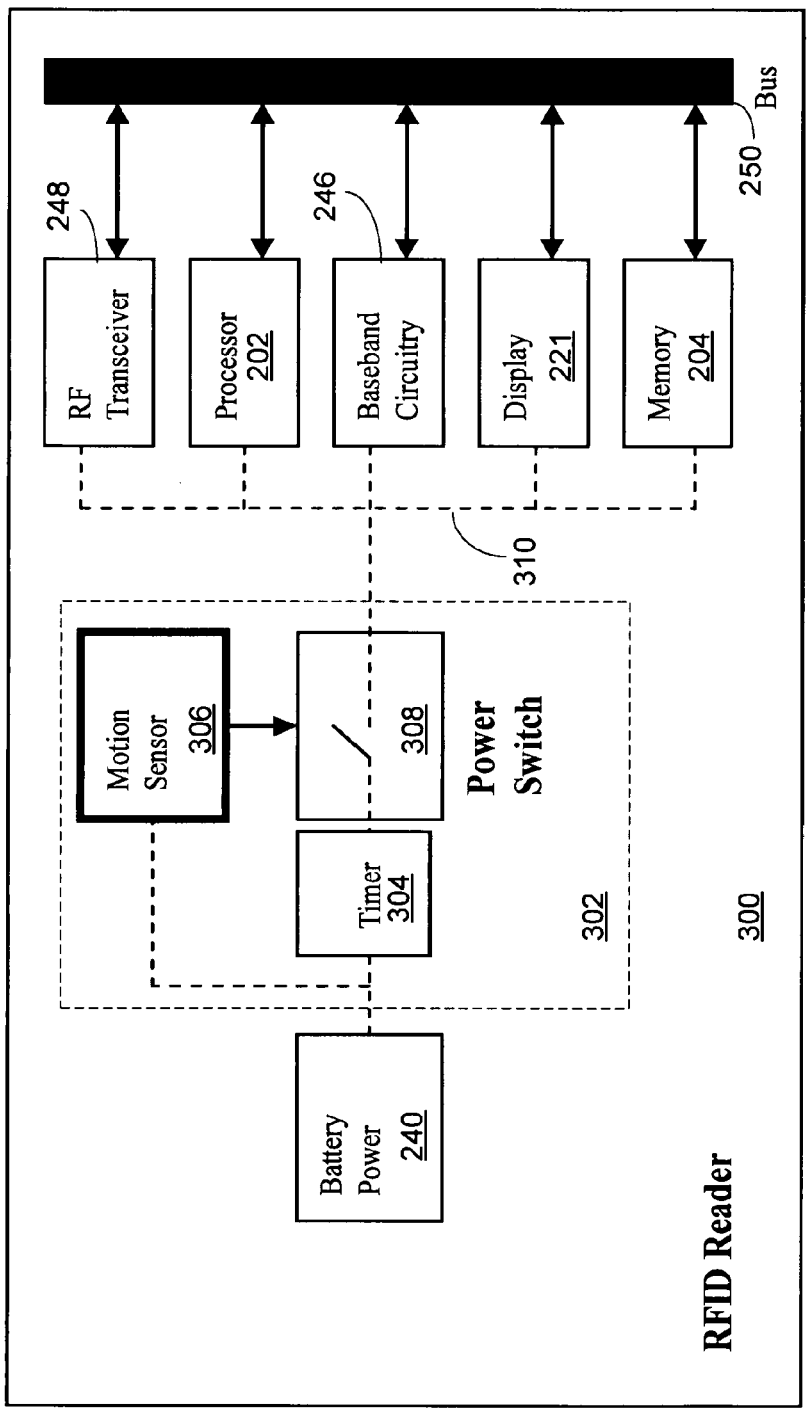
FIG. 3 is a block diagram illustrating an RFID reader using a motion sensor for power conversation in accordance with one embodiment of the present invention.

FIG. 3 is a block diagram illustrating an RFID reader 300 having a motion sensor 306 for power conservation in accordance with one embodiment of the present invention. RFID reader 300 includes similar components as reader 235, as shown in FIG. 2B, except that reader 300 contains a motion detector 302 instead of a GPS device. Motion detector 302, in one embodiment, includes a motion sensor 306, a timer 304, and a power switch 308. Power switch 308 is substantially the same device as power switch 242, except that power switch 308 is controlled by motion detector 302 while power switch 242 is controlled by GPS device 244.

Motion sensor 306 is an electronic device that detects objects or physical movement in a predefined area. For example, motion sensor 306 may employ infra-red detector, acoustical detector, or a combination of both for identifying any motions. Timer 304, which could be a digital, mechanical, electromechanical, or software clock, is used to control the sequence of an event or process. For example, when motion sensor 306 detects no movement, it instructs timer 304 to start clocking. When timer 304 reaches a predefined time period such as 5 seconds, if there has been no motion within that time period then timer 304 may issue a non-motion command. Upon receipt of the non-motion command, power switch 308 subsequently turns off all or a portion of the components of reader 300 for power conservation.

In one embodiment, mobile or fixed reader applications use non-zero motion as a signal that a reader should become ready to read. If there is zero motion for a period of time, a reader should go into a sleep state to conserve power. During the operation, if reader 300 has been stationary or still for a certain period of time, as measured by timer 304, power management powers down all or a portion of the circuits in reader 300 (i.e., RF transceiver 248, processor 202, baseband circuitry 246, display 221, memory 204). In this embodiment, motion detector 302 is configured to remain active at all time (except when the reader is forced to power down with a manual power off control) whereby it can wake up reader 300 when any movement of reader 300 is detected. For example, motion detector 302 may continue to operate (i.e., motion sensor 306, timer 304, and power switch 308 are awake) to monitor the status of the reader. Once reader 300 is moving again, motion sensor 306 detects the non-zero motion and sends a signal to power switch 308 to wake up the sleeping circuits. It should be noted that an RFID device such as a reader is in sleeping mode (or sleep state) if one or more components such as a display on the device are in sleeping mode.

It should be noted that a user may adjust non-zero motion value, which defines the conditions or standards for a non-zero motion. The non-zero motion value also depends on the application of the RFID reader. It should be further noted that in addition to motion detector 302, reader 300 may also include a GPS device 244 for managing power consumption.

Figure 4:
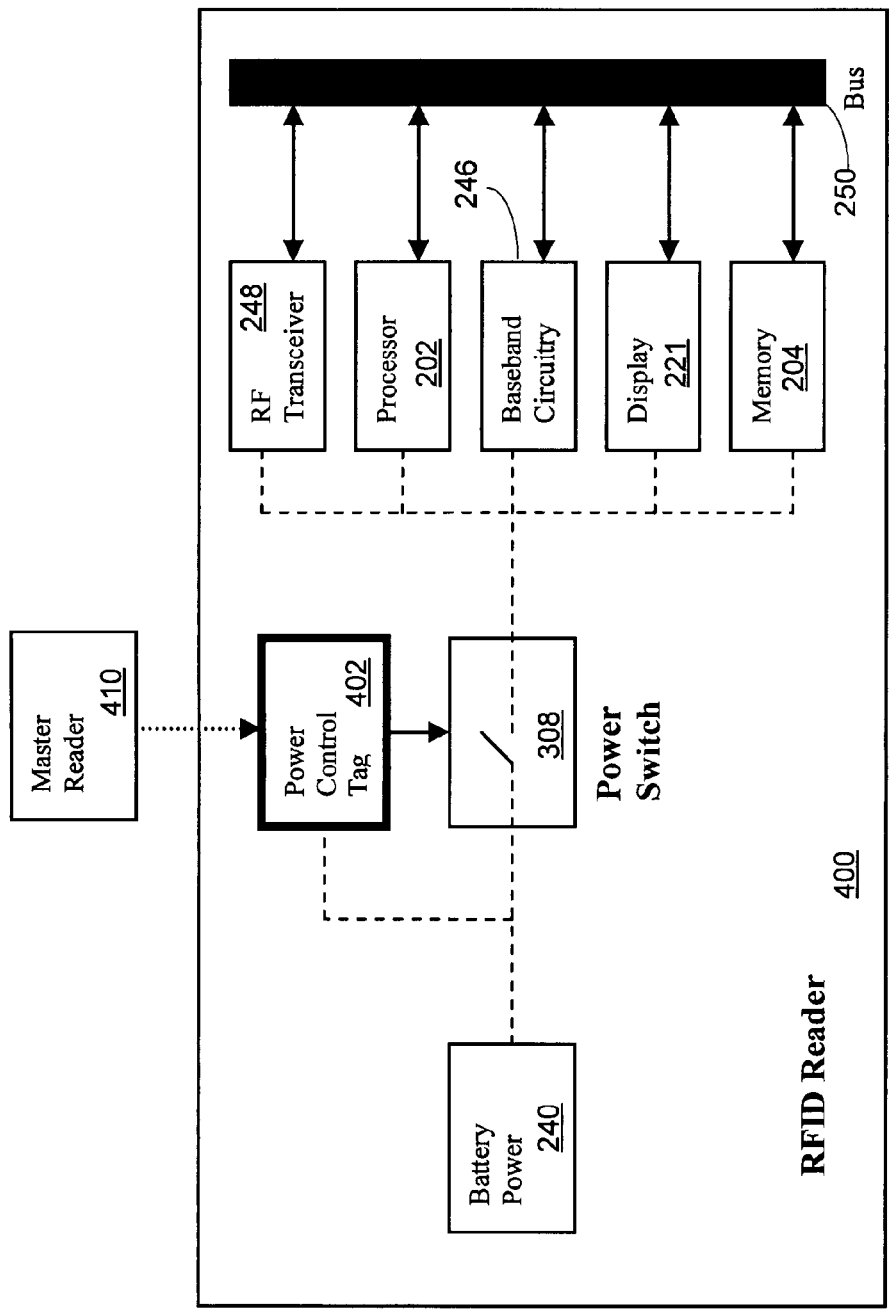
FIG. 4 is a block diagram illustrating an RFID reader using a power control tag for power conservation in accordance with one embodiment of the present invention.

FIG. 4 illustrates an RFID reader 400 using a power control tag 402 for power conservation in accordance with one embodiment of the present invention. The power control tag 402 is a passive tag that is used to control the power to reader 400. RFID reader 400 includes similar components as reader 300, as shown in FIG. 3, except that reader 400 contains a power control tag 402 instead of motion detector 302. Power control tag 402, in one embodiment, is coupled to an external RFID device such as a master reader 410. It should be noted that reader 400 may also include a motion detector 302 and a GPS device 244.

Reader 400, in one embodiment, is configured to be activated from the sleeping mode by a nearby master reader 410. Master reader 410 can be another RFID reader. For example, if reader 400 is in the sleep state, master reader 402 can be used to interrogate the power-control tag 402. Power control tag 402 obtains its power from its antenna; when it is interrogated by master reader 410. After obtaining power the power control tag 402 generates a power-on signal to turn on power switch 308, which subsequently powers up reader 400. It is therefore the close proximity of power control tag 402 to a master reader 410 and its interrogation by reader 410 that activates reader 400 from the sleeping mode.

A special configured master reader 410 with a long-range transmission capability may be used to activate all of the nearby sleeping readers such as reader 400. Alternatively, a method of activating nearby RFID device(s) may be employed where once a reader is activated (or turned on), it is responsible to activate another nearby reader(s), and then it (they) in turn does the same, etc. A rippling effect of activating all readers in a region occurs. A variety of other methods, such as manual switching and identifying ambient information from the surrounding environment can be used to determine when reader 400 should enter the sleep mode again.

Figure 5:
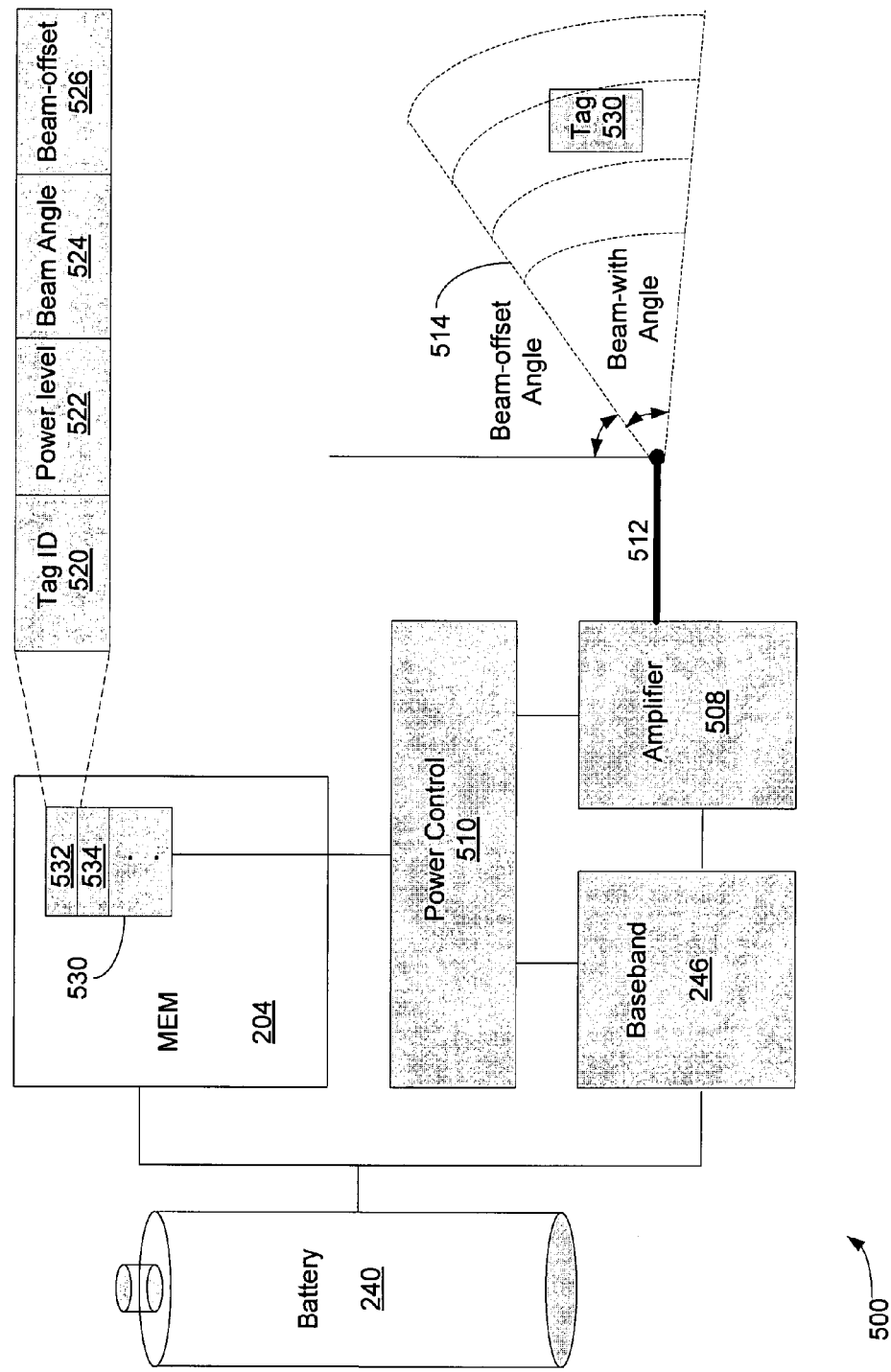
FIG. 5 is a block diagram illustrating an RFID reader using a transmission power control for power conservation in accordance with one embodiment of the present invention.

FIG. 5 is a block diagram illustrating an RFID reader 500 using transmission power management for power conservation in accordance with one embodiment of the present invention. RFID reader 500 includes similar components as reader 400, as shown in FIG. 4, except that reader 500 includes a transmission power control 510 instead of a power control tag. Reader 500 includes a battery 240, a memory 204, and a power control 510. Memory 204 is further configured to include a storage location 530. Storage location 530, in one embodiment, is configured to have multiple entries 532-534 wherein each entry further contains a tag ID 520, a power level 522, a beam-width angle 524, and a beam-offset angle 526. Tag Id. 520 identifies a particular tag while power level 522 indicates optimal power level to read a tag, which is identified by tag ID 520. Beam-offset angle 526 and beam-width angle 524 identify desirable angles to aim at a tag before reading. Beam-offset angle 526 rotates the beam, and beam-width angle 524 focuses or widens the beam. If the beam-offset 526 and beam-width angle 524 are closely aligned to a targeted tag, they save battery power for the reader to communicate with the targeted tag.

Referring back to FIG. 5, reader 500 employs transmission power control 510 for power conservation. For example, implementing the power management relating to transmission power can save battery power stored in battery 240. Reader 500, in one embodiment, uses wireless signal propagation in the air and signal interference characteristics in a designated area to determine a power efficient level (or an optimal level) of transmission power to perform a tag read. It should be noted that a tag read is performing an RFID read to one or more tags in a designated area (or region). For example, if an application requires a tag read within a given radius 514, the power to perform the tag read for reader 500 is adjusted to match radius 514. Any tags such as tag 530 are located within the radius 514 will be read. Conversely, any tags that are located outside of the radius 514 will not be read by reader 500.

In another embodiment, the power management is capable of adjusting beam angles as shown in FIG. 5 to conserve power consumption. To enhance reading efficiency, the power management identifies desirable angles of the electronic beam, which, for example, can be the most direct, narrowest and shortest beam between the reader and the tag. The identified angles are stored in beam-width angle 524 and beam-offset angle 526 of storage location 530. In other words, to reduce power consumption, the angles of the electronic beam are adjusted to focus the beam energy more directly to a targeted tag.

During an operation, if the goal is to read a particular tag such as tag 530, power control 510 initially starts with a low transmission power level from its antenna 512. If reader 500 can not read tag 530 correctly, power control 510 instructs amplifier 508 to adjust the transmission power level to the next higher level, and then try to read tag 530 again. If reader 500 still can not correctly read tag 530, amplifier 508 increases the transmission power level again until reader 500 can read tag 530 correctly. Once the read is successful, the tag id of tag 530 and its optimal or efficient power level are stored in storage location 530. The values stored in storage location 530 will be referenced for future readings.

An advantage of using transmission power control is to conserve limited power usage. Another advantage of using the transmission power control is to reduce signal (radio frequency) interference (noise) in the area. For example, if an RFID reader has a directional antenna or multiple antennas and beam-forming capabilities, the reader can use an optimum level of transmission power to focus on a particular tag or a set of tags. It should be noted that parameter settings for transmission power control such as tag ID 520 and power level 522 are used for future interrogations. Receiver gain, for instance, is another parameter that can affect the range of a reader that can reach because lower receiver gain should decrease the range of the reader while high receiver gain increases the range of the reader.

Grouping multiple individual data transmissions into a single larger data transmission can conserve power in an RFID device such as a reader. For example, reader 500 is configured to interrogate tags and to receive tag data (or responses) from various tags. Reader 500 stores every individual tag data in its memory, and subsequently assembles a single larger data stream from the individual tag data. Once the single larger data stream reaches a predefined size, reader 500 makes a single data transmission transmitting the single larger data stream to its destination, such as an access point or a server.

Reducing the number of transmissions can conserve power. Single transmission for a large data stream generally consumes less transmission energy or transmission power than multiple transmissions for multiple small individual data streams. It should be noted that grouping multiple individual tag data into one large data stream of tag data can be effective for some non-time critical applications. For example, in an inventory control environment, a mobile inventory control reader interrogates several stationary tags, groups their responses, and then transmits the grouped responses to an access point/server.

Figure 6:
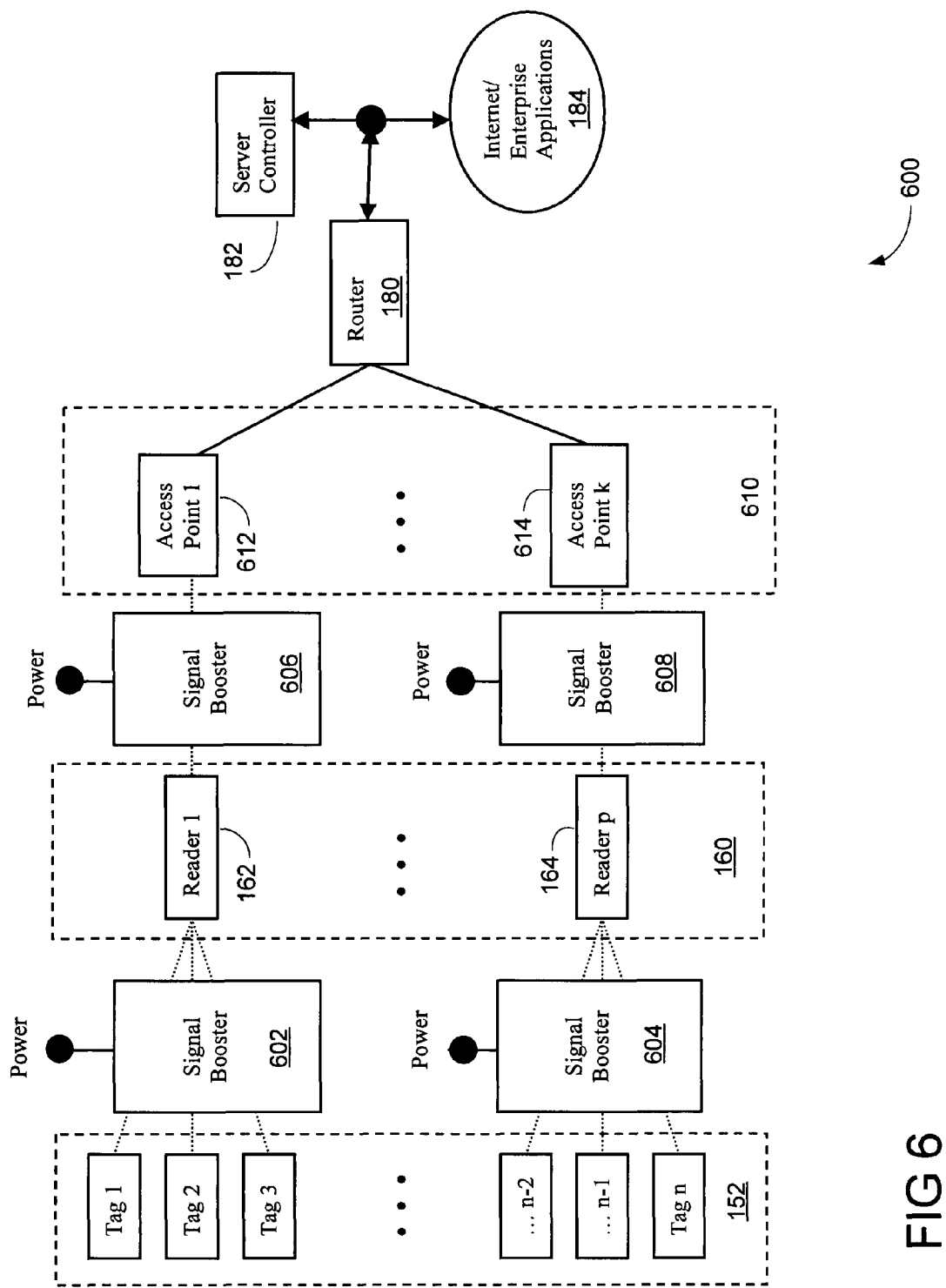
FIG. 6 is a block diagram illustrating an RFID reader using signal boosters for power conservation in accordance with one embodiment of the present invention.

FIG. 6 illustrates an RFID system 600 using signal boosters for power conservation in accordance with one embodiment of the present invention. RFID system 600 includes tags 152, readers 160, access points 610, and signal boosters 602-608. Access points 610 includes multiple access points 612-614 wherein access points 612, for example, may be a cellular packet-based network, a WLAN access points, or a combination of WLAN and cellular network. Router 180 is coupled to servers connected over the Internet 184 via access points 610.

Signal boosters 602-608, also known as repeaters, are capable of accessing AC power or a larger battery power. A function of signal boosters 602-608 is to expand an RFID reader's coverage (or range) by boosting the RFID signal strength. Signal booster 602-608 can also assist other RFID devices active tags 152 to reach regions beyond their own capabilities partially due to the limited portable power source. Boosters 602-608 are configured to use external antennas to collect surrounding signals and use amplifier to boost or amplify the received signals before re-broadcasting them.

An advantage of using signal boosters 602-608 is to increase the readers' or tags' effective communication range without increasing their battery consumption. In other words, signal boosters 602-608 are configured to use their relaying capabilities to improve signal strength. Signal boosters 602-608 can amplify both uplink and downlink signals. For instance, for an uplink transmission, signal booster 602-608 can assist signals traveling from a tag to a reader, and then from the reader to an access point. Similarly, for a downlink transmission, signal booster 602-608 boost signals traveling from an access point to a reader, and then from the reader to a tag. Another advantage of using signal boosters 602-608 is to reduce RFD rollout cost because signal boosters can increase the devices' (readers and/or tags) physical coverage thereby reducing the number of readers needed to cover a given physical area.

Figure 7:
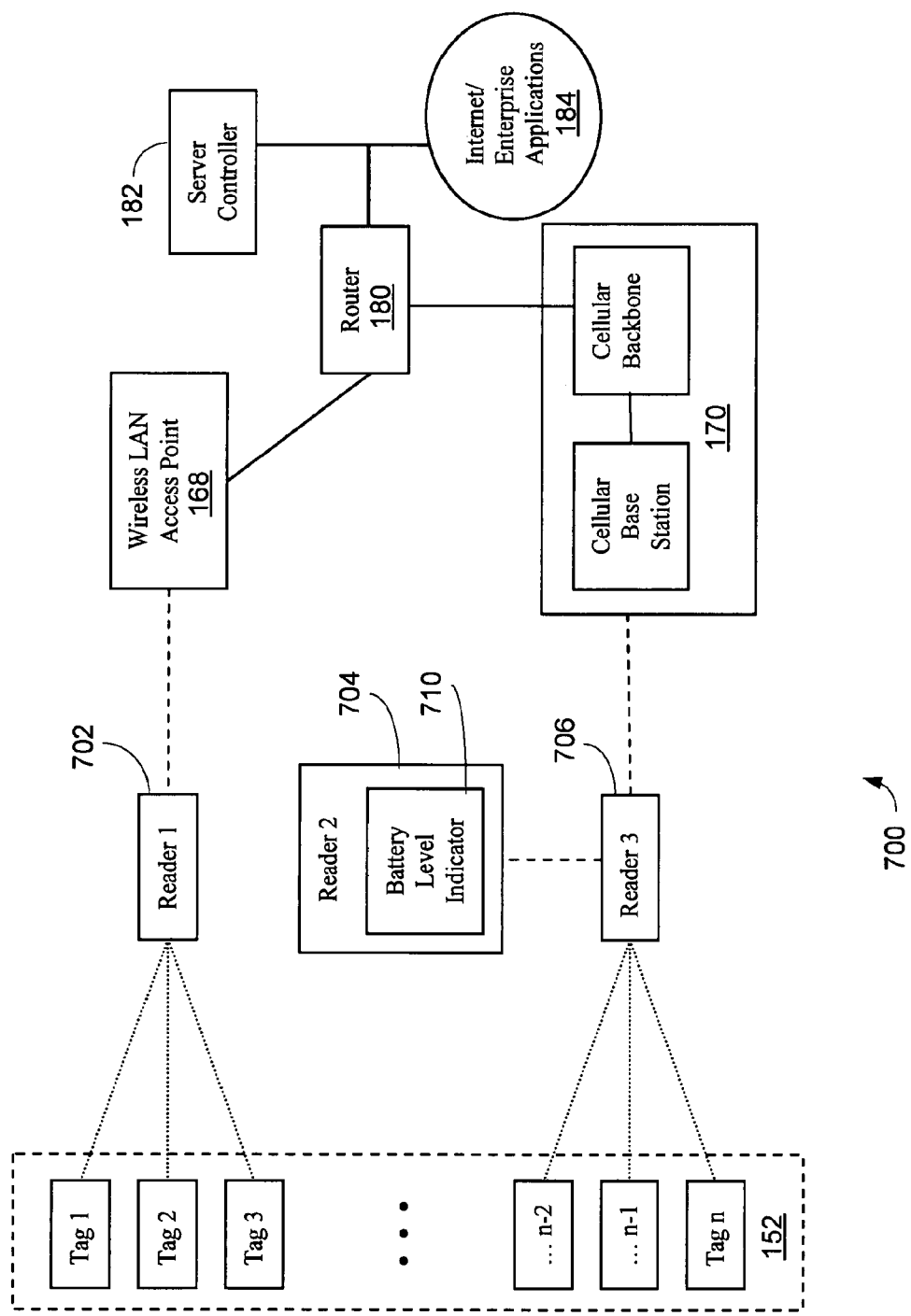
FIG. 7 is a block diagram illustrating an RFID reader using ad-hoc/mesh networking for power management in accordance with one embodiment of the present invention.

FIG. 7 is a block diagram illustrating an RFID system 700 using ad-hoc/mesh networking for power conservation in accordance with one embodiment of the present invention. System 700 further includes WLAN 168, cellular network 170, tags 152 and readers 702-706. To more effectively managing power consumption, some readers such as reader 704 contain battery level indicators 710. Battery level indicator 710, for example, indicates a power level associated with reader 704. System 700 is coupled to the Internet 184 via router 180.

A battery powered sensor or battery level indicator 710 is capable of measuring a charge level of a battery, which provides battery information about an RFID device, such as reader 704. Battery level information, for example, estimates the remaining charge or remaining charge percentage of the battery. In one embodiment, an active tag with a battery level indicator is configured to send its battery level in a transmission packet indicating its battery status. Likewise, a reader can also use some bits in a transmission packet to inform an access point about its battery level. Readers with low battery level should conserve energy by removing excess data (e.g., filtering redundant data or duplicate, and/or incomplete tag reads) before sending the data to the access point(s).

Referring back to FIG. 7, reader 710 uses a wireless ad-hoc network, also known as mesh networking. The network is ad-hoc because each network node is willing to forward data for other nodes, and so the determination of which nodes forward data is made dynamically based on the network connectivity. A node can be a system or a device within a communications network. Referring back to FIG. 7, reader 710 uses a wireless mesh network and/or power-aware wireless ad-hoc networking to transfer data to a distant destination such as access point 168 because it consumes less power by transmitting to a closer network node such as reader 706 which forwards the data to base-station 170. Ad-hoc/mesh networking can therefore be used to handle RFID data transmission and conserve power. In one embodiment, power management controls the method of a data transmission in response to devices' power status.

Reader 704, for instance, may use different wireless networks based on its battery status indicated by battery level indicator 710. If the battery level is high, reader 704 may transmit data directly to a distant access point such as WLAN access point 168. If, however, the battery level is low, reader 704 may be reprogrammed to use power-aware wireless ad-hoc networking and transmit the data to a nearby reader provided the nearby reader is able and has sufficient power to relay the data. If the nearby reader has a high battery level, it can transmit data directly to a distance access point. If, on the other hand, the nearby reader also has a low battery status, it transmits the data to another nearby RFD device. The data may continue to hop between RFID devices until it reaches its destination.

It should be noted that forwarding (or transmitting) data can hop more than once (e.g. reader 1 to 2 to 3 to cellular base station). This power-aware wireless ad-hoc networking method can conserve power by routing data via multiple hops. It, however, should be noted that the power-aware wireless ad-hoc networking may be effective for non-time critical data. For instance, if the data is time critical, the data should be transmitted directly to its destination to comply with the time critical requirement. On the other hand, if the data is non-time critical, the data can be transmitted using the power-aware routing algorithms to conserve power.

Larger batteries and smaller transmission power generally can prolong lifetime of RFID devices because larger batteries with power efficient management reduce the frequency of battery recharges for the RFID devices. Readers 702-706, for example, can be incorporated into other electronic devices having larger batteries, such as cellular phones, PDAs, laptops, digital cameras, wireless game consoles, and so forth. Some electronic devices may have multiple wireless radios with different communication capabilities such as 802.11* wireless LAN, cellular (GPRS, CDPD, 2.5G, 3G, etc), Bluetooth, Ultra-Wide Band (UWB), Zigbee, and other ad-hoc/mesh network technologies. If an electronic device has more than one radio communication capabilities, an RFID device that is integrated into the electronic device can pick and choose one of the several radios (e.g. the lowest power consuming radio) to perform the data transmission. Alternatively, the RFID device may also be configured to put the extra radios into a sleep state in order to save power.

An RFID system application, in one embodiment, resides in a server connected over the Internet, a router, or a reader, wherein the application is configured to control the tag reads for RFID readers such that the same tag is not interrogated multiple times by different readers. It should be noted that multiple successful interrogation of the same tag by different readers would not yield any new information and would only waste resources such as battery energy of readers. As such, minimizing multiple tag readings of the same tag can conserve power.

Some RFID system applications are further configured to employ power management to implement methods of graceful system degradations. For example, when the battery power level of an active tag falls to a low power or zero power level, instead of complete failure, the RFID application employs power management to gradually phase out the low power active tag device. Power management may reprogram or reassign nearby tags to perform functions originally carried out by the low power active tag device. Likewise, some low power readers may no longer be able to perform tag reads and other nearby readers may carry out those functions instead. RFID applications are further configured to adapt their user interface and display to take into account that some tags and readers are not functioning due to low-power. For example, if an RFID application is configured to display a map using ambient data (e.g. temperature, light, sound, video, acceleration, vibration, pressure and movement), it may still show the map with measured data from available working active tags. For the areas in which active tags have run out of battery, the RFID application can display blank information. Alternatively, the RFID application can interpolate sensed data from nearby working tags and display the map with the interpolated information. Interpolated information, in one example, may be displayed with one particular color that differentiates interpolated data from actual measured data.

Figure 8:
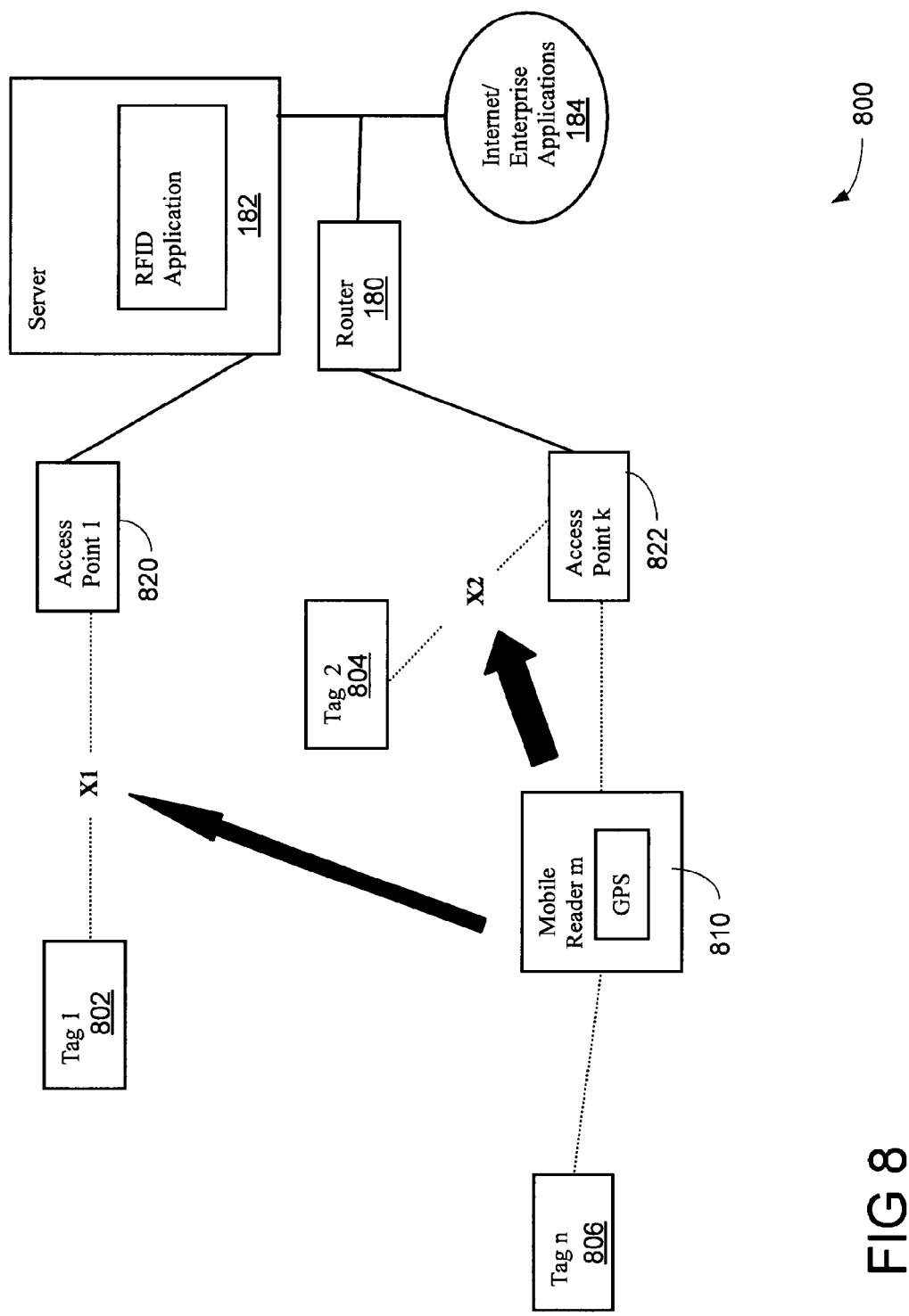
FIG. 8 is a block diagram illustrating an RFID system using RF coverage and interference levels for power management in accordance with one embodiment of the present invention.

FIG. 8 is a block diagram illustrating an RFID system 800 using RF coverage and interference levels for power conservation in accordance with one embodiment of the present invention. System 800 includes tags 802-806, a mobile reader 810, and access points 820-822. Mobile reader 810 employs power efficient management for identifying reading locations or zones with lowest interference levels and/or strongest RF coverage locations.

RF coverage and interference levels concerning wireless networks and RFID devices can be measured before-hand or predicted using RF electromagnetic propagation models. The strength of the RF field reduces inversely proportionally to the square of the distance in free space. The RF field is also attenuated by metal objects and multi-path travel caused by reflections. The RF field is also a function of the polarization angle between the RFID device's transmitter antenna and a receiver antenna. The range of a tag, for example, can be increased when polarization angles between the tag and the reader are aligned.

RFID reader 810 is configured to determine power efficient geographic location or optimal power efficient location using positioning information. Positioning information may be obtained via GPS devices, cell related information from the cellular networks, or triangulation schemes. The power efficient, optimal or suboptimal positions are identified in response to the power consumption point of view between tags and readers. At high interference areas, RFID devices need to increase their power level to overcome or compensate for the noise (interference) level. As such, readers should perform tag read operations at locations with minimal RF interference. RFID devices (readers and tags) can normally operate at low power levels in locations with minimal RF interference. For example, readers should not perform a tag read in an area with high interference because interrogating a tag in the area with high interference consumes greater power than areas with low interference. Similarly, active tags should avoid performing any data transmission in high interference areas. In one example, if an active tag is on a moving container, a reader should not perform a tag read until the tag reaches a low interference location.

During an operation, an RFID system is capable of instructing reader 810 to interrogate tags 802-806 at power efficient positions according to RF coverage information and positioning information stored in mobile reader 810. If, for example, position X1 is a power efficient position for reader 810 to interrogate tag 802, then reader 810 should use position X1 to read tag 802 and forward the data it reads to access point 820. In this example, reader position X1 is close to both tag 802 and access point 820. Position X1 therefore reduces the power consumption for both the reader-tag communication and the reader-access point communication. Similarly, if position X2 is a power efficient position for the reader to interrogate tag 804, then reader 810 should use position X2 to read tag 804 and forward the data it reads to access point 822. It should be noted that RF fields are three-dimensional, and power efficient positions should be considered and measured in three-dimensional with x, y, z co-ordinates.

To implement power management, various application triggers for power saving methods can be entered in an RFID system. Triggers can reside in readers 160, access points 166, base stations 170-172, routers 180, or server controller 182. Triggers have tag and reader components (e.g. tag with ID X enters the range of Reader A). Examples of triggers include tag enters reader's range, tag leaves reader's range, tag in reader's range is moving, tag has been in reader's range for a time period, and tag has been out of reader's range for a time period. Triggers illustrated in the present invention are configured to be associated with actions or events so that when a trigger occurs, the corresponding action(s) such as power saving events for a tag and/or a reader are performed.

The present invention further illustrates a power saving technique for RFID tags used in an RFID system. Battery replacement for active tags can be difficult because of the volume of active tags employed. Active tags, in one embodiment, can be integrated into other electronic devices such as cellular handsets, PDAs, laptops, digital cameras, wireless game consoles, and so forth. Active tags that are integrated in an electronic device are allowed to access the large batteries of the electronic device. The ability to access the large batteries of an electronic device prolongs the lifetime of the active tag. In another embodiment, the active tag no longer requires a battery because it can use the batteries of the electronic device. This reduces the cost of the active tag.

The present invention further illustrates a power saving management by adjusting internal clock cycles or frequency to conserve power. For example, RFID devices are capable of adjusting the operating clock cycles to the lowest possible clock frequency for power conservation. During a period of low reader activity, reducing the operating clock cycle will not affect the reader's performance. Decreasing the clock cycle will reduce the load current from the power source. It should be noted that decreasing the load current by a given factor will result in a greater factor increase in battery life. Thus, it is advantageous to run circuits at a lower frequency, so that the load current is reduced and the battery lifetime is increased.

Active tags, in one embodiment, are configured to enter power down, or low-power state, for their circuitry at regular time intervals. It should be noted that power management can be implemented in RFID middleware and/or application software. The applications are capable of adapting their usage of low-power tags. For example, the applications may instruct readers to read low-power tags less frequently and switch low-power tags into a sleep state more often. The applications can also determine which tags are not needed at a particular time or location and then use readers to put those tags into a sleep state. RFID middleware and application software may reside on server controller 182, router 180, WLAN access points 166, and/or base-stations 170-172 of FIG. 1B.

Figure 9:
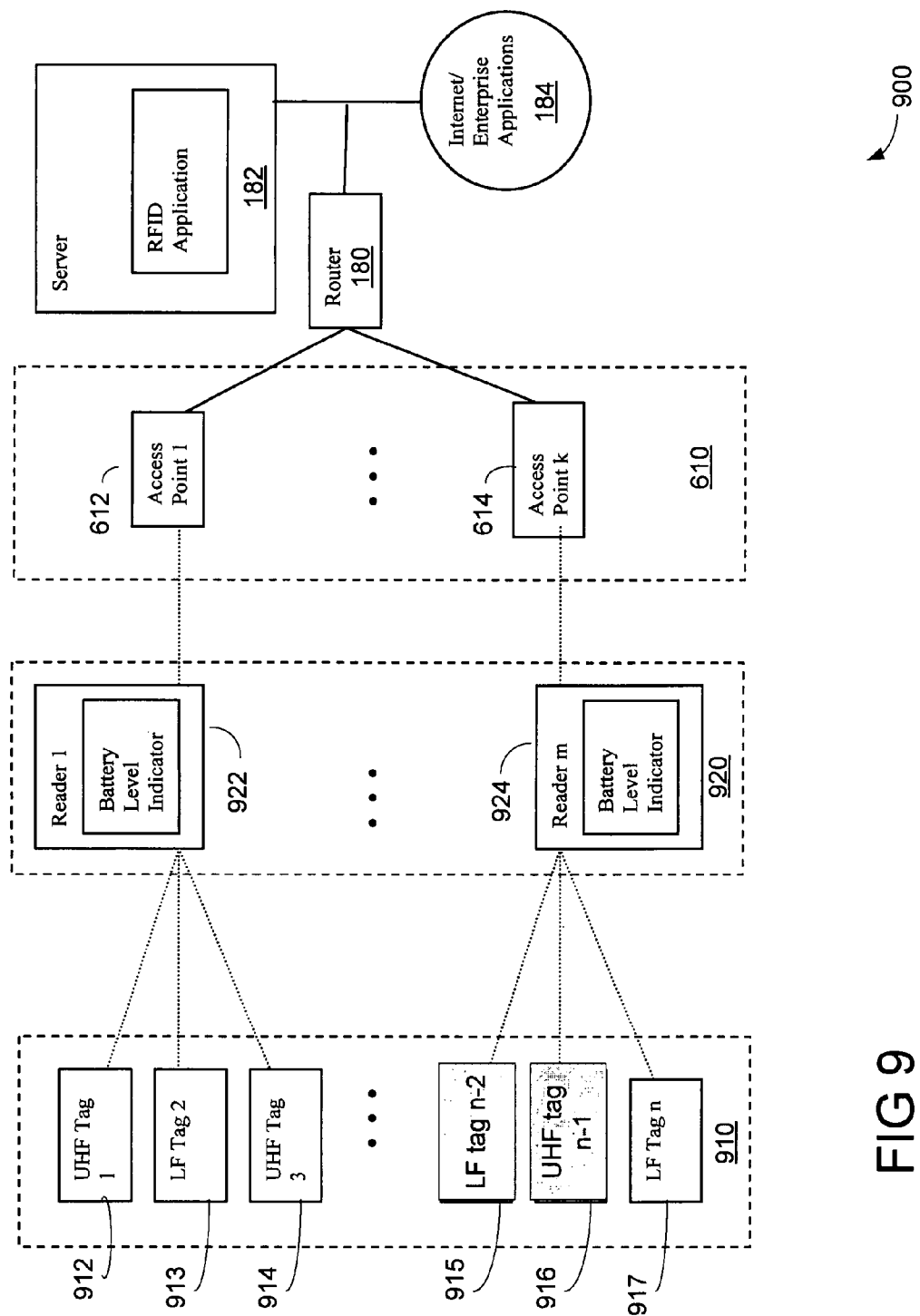
FIG. 9 is a block diagram illustrating an RFID system using tag frequency information for power management in accordance with one embodiment of the present invention.

FIG. 9 is a block diagram illustrating RFID system 900 using tag frequency information in accordance with one embodiment of the present invention. System 900 includes tags 910, reader group 920, and access point group 610. Tags 910, in one embodiment, contain Ultra High Frequencies ("UHF") tags 912 and Low Frequency ("LF") tags 913. Reader group 910 includes multiple readers 922-924 wherein each reader includes a battery level indicator.

RFID tags are designed and operated in several different frequencies such as UHF tags and LF tags. UHF tags offer faster data rates and longer range data transmission. UHF tags, however, consume more power than LF tags. LF tags, on the other hand, offer slower data rates than UHF tags but they consume less power than UHF tags. LF tags are capable of penetrating non-metallic material such as liquids. As such, if an RFID application has access to both UHF tags 912 and LF tags 913, LF tags 913 should be used instead of UHF tags 912. For example, if an RFID application is mapping sensed temperatures and it can read from both UHF tags and LF tags, the application should use LF tag. The application may also adapt itself based on power level. For example, when the battery level is high, the reader reads passive UHF tags and when the battery level falls below a predefined battery low level, the reader switches to use LF tags instead.

In another aspect, the data structure used in a tag affects the power efficiency of the tag. Efficient and compact representations should be used for storing tag information and sensed data. For example, a reader consumes less power to interrogate a tag with compact data representations than a tag with non-compact data structure. Active tags also consume less power to transmit their compact data structure to readers. Similarly, compact representations reduce the transmission power required for readers 920 to pass the read data to an access point 610, router 180 or server controller 182.

Figure 10:
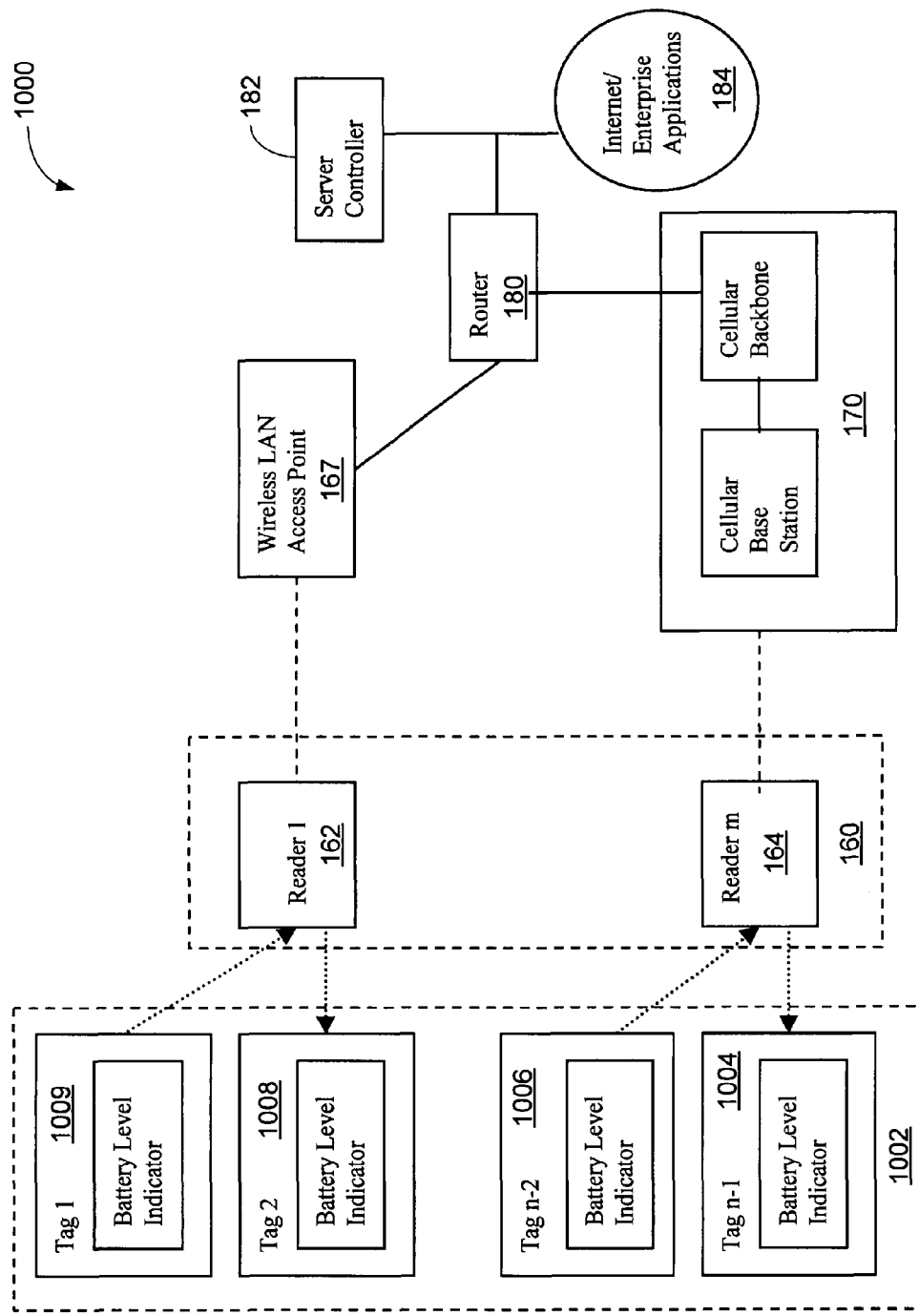
FIG. 10 is a block diagram illustrating an RFID system using communication between active tags and readers for power management in accordance with one embodiment of the present invention.

FIG. 10 is a block diagram illustrating an RFID system 1000 having power management for active tags in accordance with one embodiment of the present invention. System 1000 includes active tag group 1002, reader group 160, WLAN access point 167 and cellular network 170. Tag group 1002 further includes multiple active tags 1004-1009 wherein each active tag contains a battery level indicator. The battery level indicator is used to monitor power capacity within the tag.

Active tags 1004-1009, in one embodiment, include digital processing controllers for power management and perform their tasks depending on their power levels. Alternatively, readers 162-164 can also act as controllers for power management for active tags 1004-1009. For example, when the battery level of tag 1009 falls below a certain predetermined power level, tag 1009 transmits a battery-low signal to a nearby reader(s) such as reader 162 indicating its low power status. Reader 162 subsequently reprograms tag 1009 including its sensor to conserve battery consumption within tag 1009. In another embodiment, reader 162 reprograms other available and/or nearby devices with higher battery levels such as tag 1008. For example, reader 162 reprograms tag 1008 to perform tasks which were previously performed by tag 1009.

Figure 11:
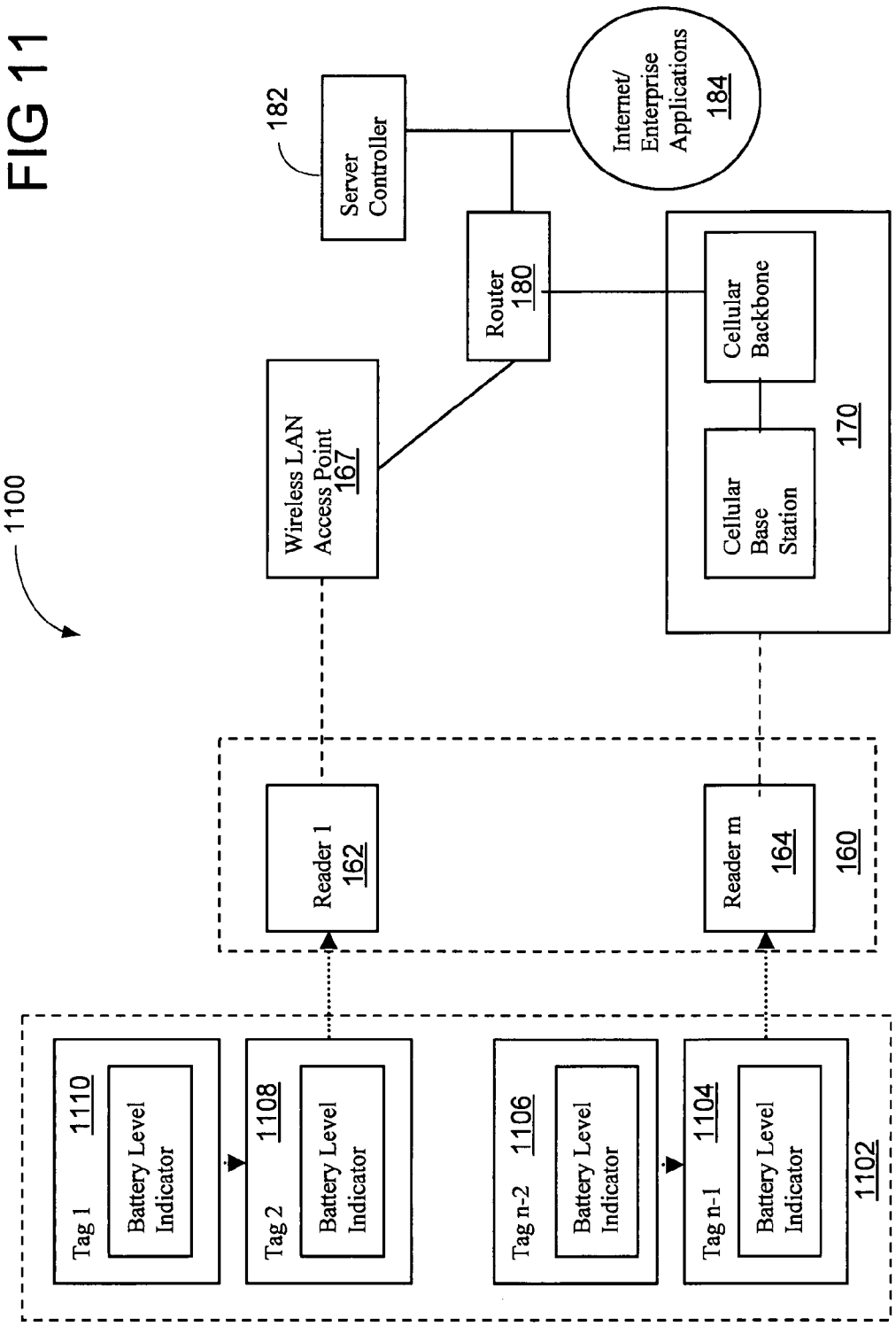
FIG. 11 is a block diagram illustrating an RFID system using active tag communications for power management in accordance with one embodiment of the present invention.

FIG. 11 is a block diagram illustrating an RFID system 1100 having power management for active tag communications in accordance with one embodiment of the present invention. System 1100 includes active tag group 1102, reader group 160, WLAN access point 167 and cellular network 170. Tag group 1102 further includes multiple active tags 1104-1110 wherein each active tag contains a battery level indicator. The battery level indicator is used to monitor power capacity or power level within each active tag.

Active tags 1104-1110, in one embodiment, include digital processing controllers for power management and perform the tasks depending on their power levels. For example, active tag 1110 senses its low battery status from its battery level indicator or power sensor, and then informs other nearby active tag(s) such as tag 1108 about its low battery status. When a nearby tag such as tag 1108 receives the information that tag 1110 is approaching a low battery status and will not be able to function properly, tag 1108 is subsequently reprogrammed or reassigned to perform tasks that otherwise are performed by tag 1110. In other words, power management, which could reside in the active tag or a reader, reassigns tasks from a low battery tag to another nearby tag. For example, low power tag 1106 communicates directly to tag 1104 requesting tag 1104 to perform the functions of tag 1106. Once tag 1104 is reassigned to do the functions of tag 1106, tag 1104 informs reader 164 about the change. It should be noted that the reassigning process could involve more than one hop (e.g. tag 1 to tag 2 to tag 3).

Figure 12:
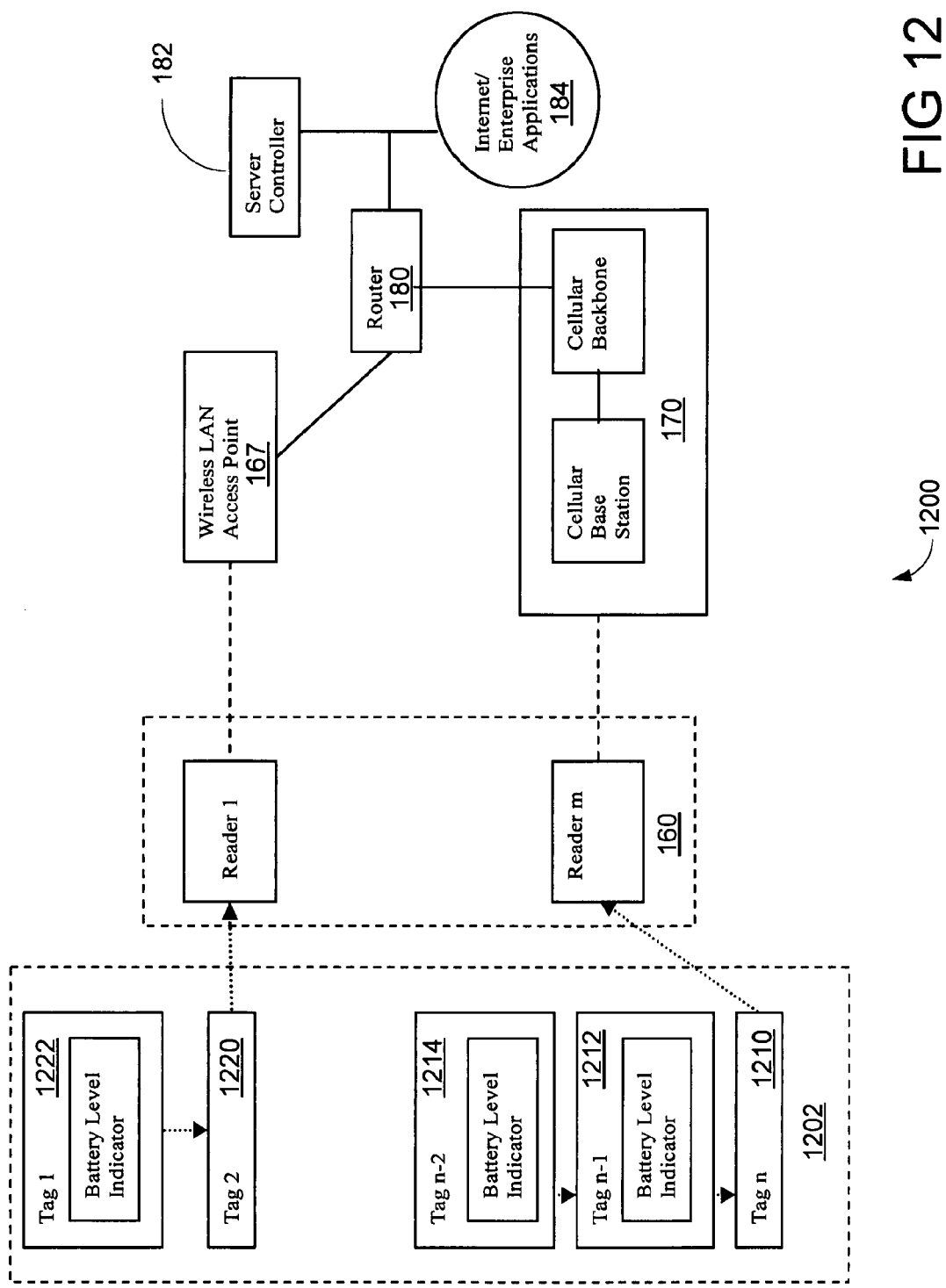
FIG. 12 is a block diagram illustrating an RFID system having power management using active tag ad-hoc/mesh networking in accordance with one embodiment of the present invention.

FIG. 12 is a block diagram illustrating an RFID system 1200 having power management using active tag ad-hoc/mesh networking in accordance with one embodiment of the present invention. System 1200 includes active tag group 1202, reader group 160, WLAN access point 167 and cellular network 170. Tag group 1202 further includes multiple active tags 1210-1222, wherein some active tags contain battery level indicators. The battery level indicator is used to monitor power capacity or power level within each active tag.

Active tags 1210-1222, in one embodiment, include digital processing controllers for power management and perform the tasks depending on their power levels. In one embodiment, a low-power active tag sensor can use mesh networks and/or power-aware wireless ad-hoc networking algorithms to transfer data from a low-power tag to a distant reader. Since transmission power is proportional to the square of the distance, it is more efficient for a low-power tag to use ad-hoc networking methods and transmit its data to a closer network node than make a single transmission to a distant reader.

Referring back to FIG. 12, low-power active tag 1222 is configured to transmit its data to active tag 1220, since tag 1220 is physically situated closer to reader 1. Upon receipt of data from tag 1222, active tag 1220 forwards the data to reader 1. Data transmission of tag 1222 data via tag 1220 consumes less battery power than tag 1222 transmitting data directly to reader 1. In another embodiment, ad-hoc networking between active tags can include multiple hops. For example, active tag 1214 forwards its data to active tag 1212, and tag 1212 again forwards the data to active tag 1210. After active tag 1210 receives the data from tag 1212, it then transmits the data to reader 1. It should be noted that the power-aware wireless ad-hoc networking may be carried out selectively. For example, if the data is time-critical, the data is transmitted directly to a reader immediately. If, however, the data is non time-critical, the power-aware routing algorithms described above may be used.

In another embodiment, signal boosters (or repeaters) with access to AC power or larger battery powers can be used to boost the effective range of active tags. As mentioned above, boosters generally use external antennas to collect the best signals and an amplifier which amplifies the signals before re-broadcasting the improved signal strength signals. This technique allows a low battery active tag to lower its transmission power because it relies on the signal boosters to increase its signal strength and range. The boosters can amplify uplink signals (i.e., tag to reader, and then reader to access point) and downlink signals (i.e., access point to reader and then reader to tag).

The present invention includes various processing steps, which will be described below. The steps of the present invention may be embodied in machine or computer executable instructions. The instructions can be used to cause a general purpose or special purpose system, which is programmed with the instructions to perform the steps of the present invention. Alternatively, the steps of the present invention may be performed by specific hardware components that contain hard-wired logic for performing the steps, or by any combination of programmed computer components and custom hardware components. While embodiments of the present invention will be described with reference to wireless communications networks, the method and apparatus described herein is equally applicable to other network infrastructures, or other data communication environments.

Figure 13:
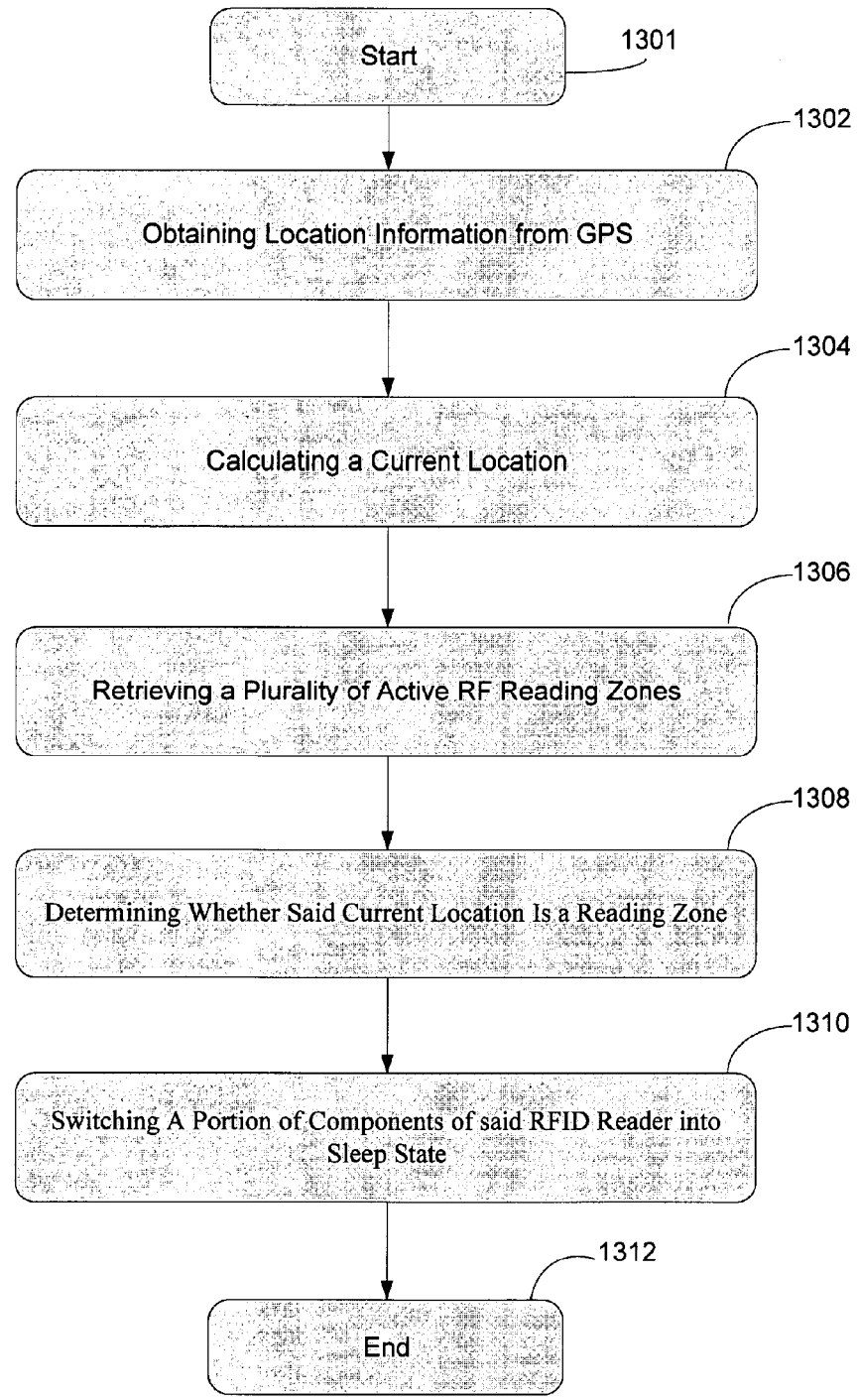
FIG. 13 is a flowchart illustrating a process of power management for an RFID system in accordance with one embodiment of the present invention.

FIG. 13 is a flowchart illustrating a process of power management for an RFID system in accordance with one embodiment of the present invention. The process starts at block 1301 and proceeds to block 1302, the process obtains location information from a GPS device. In one embodiment, the GPS receiver is installed in a reader and it obtains the location information in relation to the reader from a GPS in a satellite. It should be noted that the process may also obtain information from a motion sensor installed in the reader. Once the location information is received, the process moves to the next block.

At block 1304, the process calculates a current location or real-time geographic location of the reader according to the location information. If the reader is constantly moving, the process is configured to estimate a reader's real-time location by projecting the direction and speed of the mobile reader according to the location information and the GPS information received earlier. After block 1304, the process moves to the next block.

At block 1306, the process retrieves a plurality of active RF reading zones stored in a storage location in the reader, or downloaded to the reader from an access point 166, base station 170-172, router 180, enterprise application 184, or server controller 182. Active RF reading zones can be physical spaces and rooms that require the reading of tags, and/or areas with low interference and/or proper RF signal coverage. The process subsequently moves to the next block.

At block 1308, the process determines whether the current location is within at least one of the active reading zones. In one embodiment, the process identifies power efficient reading zones from the active RF reading zones according to the location information since not every retrieved active reading zone can be the power efficient reading zone. Once the power efficient reading zone is identified, the process compares the current location, or the current real-time geographic location, with the power efficient reading zone to determine whether the reader is within the power efficient reading zone or is outside of the power efficient reading zone. In one embodiment, the process is capable of identifying a reading zone with minimal interference in response to the power efficient reading zone. The process is further capable of updating stored information according to new information received and detected in the power efficient reading zone. Once the process identifies whether the reader is within the power efficient reading zone, the process proceeds to the next block.

At block 1310, the process switches at least a portion of components such as a display of the reader into a sleep state to conserve power if the current location is outside of any said reading zones. In another embodiment, the process is also capable of activating the reader from the sleep state to an active state if the current location is within the active reading zones.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for controlling power consumption of a plurality of tags communicatively coupled to a radio frequency identification (RFID) reader through an ad-hoc/mesh network, each tag in the plurality of tags comprising a battery, tag data, and a battery level indicator, the method comprising:
   receiving a low battery power signal from the battery level indicator of a first tag in the plurality of tags when the first tag battery level reaches below a predefined level, wherein the first tag data comprises time-critical tag data and non-time critical tag data;
   in response to receiving the low battery power signal, (i) identifying a second tag in the plurality of tags communicatively coupled to the RFID reader through the ad-hoc/mesh network, the second tag closer to the RFID reader than the first tag, the second tag comprising a battery level indicator that has not generated a low battery power signal, (ii) transmitting the time critical tag data directly from the first tag to the RFID reader, and (iii) transmitting the non-time critical tag data from the first tag to the RFID reader through the identified second tag.

2. The method of claim 1, further comprising utilizing signal boosters configured to (i) receive signals comprising the first tag data, (ii) amplify the received signals, and (iii) re-broadcast the amplified signals to the RFID reader.

3. The method of claim 1, wherein transmitting the tag data from the first tag to the RFID reader through the identified second tag comprises transmitting the tag data from the second tag to the RFID reader through one or more other tags through the ad-hoc/mesh network.

4. The method of claim 1, wherein the first tag further comprises a digital processing controllor, wherein identifying the second tag comprises identifying the second tag by the digital processing controllor of the first tag.

5. The method of claim 1, wherein the RFID reader comprises a digital processing unit, wherein identifying the second tag comprises identifying the second tag by the digital processing unit of the RFID reader.

6. A system for controlling power consumption of radio frequency identification (RFID) tags, the system comprising:
   an RFID reader;
   a plurality of RFID tags, each tag in the plurality of tags comprising a battery, tag data, and a battery level indicator, the plurality of tags comprising a first tag comprising time-critical tag data and non-time critical tag data; and
   an ad-hoc/mesh network communicatively coupling the plurality of tags to the RFID reader,
   wherein the first tag is configured to:
   receive a low battery power signal from the battery level indicator of the first tag when the first tag battery level reaches below a predefined level; and
   in response to receiving the low battery power signal, (i) identify a second tag in the plurality of tags communicatively coupled to the RFID reader through the ad-hoc/mesh network, the second tag closer to the RFID reader than the first tag, the second tag comprising a battery level indicator that has not generated a low battery power signal, (ii) transmit the time critical tag data directly from the first tag to the RFID reader, and (iii) transmit the non-time critical tag data from the first tag to the RFID reader through the identified second tag.

7. The system of claim 6, further comprising a set of signal boosters configured to (i) receive signals comprising tag data, (ii) amplify the received signals, and (iii) re-broadcast the amplified signals to the RFID reader.

8. The system of claim 6, wherein the second tag is configured to transmit the tag data received from the first tag to the RFID reader through one or more other tags in the plurality of tags through the ad-hoc/mesh network.

9. The system of claim 6, wherein the first tag further comprises a digital processing controllor, wherein identifying the second tag comprises identifying the second tag by the digital processing controllor of the first tag.

10. The system of claim 6, wherein the RFID reader comprises a digital processing unit, wherein identifying the second tag further comprises identifying the second tag by the digital processing unit of the RFID reader.

* * * * *